United States Patent [19]

Goto

[11] Patent Number: 5,541,706
[45] Date of Patent: Jul. 30, 1996

[54] EXPOSURE CALCULATION DEVICE FOR A CAMERA

[75] Inventor: Tetsuro Goto, Funabashi, Japan

[73] Assignee: Nikon Corporation, Tokyo, Japan

[21] Appl. No.: 413,172

[22] Filed: Mar. 29, 1995

Related U.S. Application Data

[63] Continuation of Ser. No. 138,049, Oct. 19, 1993, abandoned.

[30] Foreign Application Priority Data

| Oct. 22, 1992 | [JP] | Japan | 4-284461 |
| Oct. 26, 1992 | [JP] | Japan | 4-286540 |
| Oct. 26, 1992 | [JP] | Japan | 4-311242 |

[51] Int. Cl.[6] .................................................. G03B 7/08
[52] U.S. Cl. ........................................ 354/432; 354/428
[58] Field of Search .................................. 354/432, 427, 354/428, 482, 483, 402; 348/363

[56] References Cited

U.S. PATENT DOCUMENTS

| 3,864,701 | 2/1975 | Krause | 354/483 |
| 3,873,827 | 3/1975 | Krause | 354/482 |
| 4,210,394 | 7/1980 | Safo et al. | 354/427 |
| 4,284,334 | 8/1981 | Magel | 354/427 |
| 4,364,650 | 12/1982 | Terashita et al. | 354/432 |
| 4,411,505 | 10/1983 | Sakai et al. | 354/402 |
| 4,445,778 | 5/1984 | Nakauchi | 354/432 |
| 4,479,708 | 10/1984 | Tokuda | 354/427 |
| 4,855,780 | 8/1989 | Hayakawa | 354/432 |
| 4,929,824 | 5/1990 | Miyazaki | 354/432 |
| 4,978,990 | 12/1990 | Yamasaki et al. | 354/432 |
| 4,984,085 | 1/1991 | Landowski . | |
| 5,168,364 | 12/1992 | Kondo et al. . | |
| 5,184,172 | 2/1993 | Miyazaki | 354/432 |
| 5,249,015 | 9/1993 | Takagi et al. | 354/432 |
| 5,331,422 | 7/1994 | Nishida | 348/363 |

FOREIGN PATENT DOCUMENTS 57-16410  1/1982  Japan .

*Primary Examiner*—Russell E. Adams
*Attorney, Agent, or Firm*—Oliff & Berridge

[57] ABSTRACT

In an exposure calculation device for a camera including a photometric sensor which performs photometry on the light from an object to be photographed and outputs a photometric signal related to the brightness thereof and a calculation device which calculates an exposure value based upon the photometric signal, the calculation device calculates the exposure value based upon the value obtained by subtracting a compensation value signal from the photometric signal from the object to be photographed. This compensation value signal is the stored photometric signal obtained when a condition change-over device is in its condition to prevent light from an object to be photographed from reaching the photometric device, i.e. is the signal value due to the noise component or generated as a function of temperature.

33 Claims, 21 Drawing Sheets

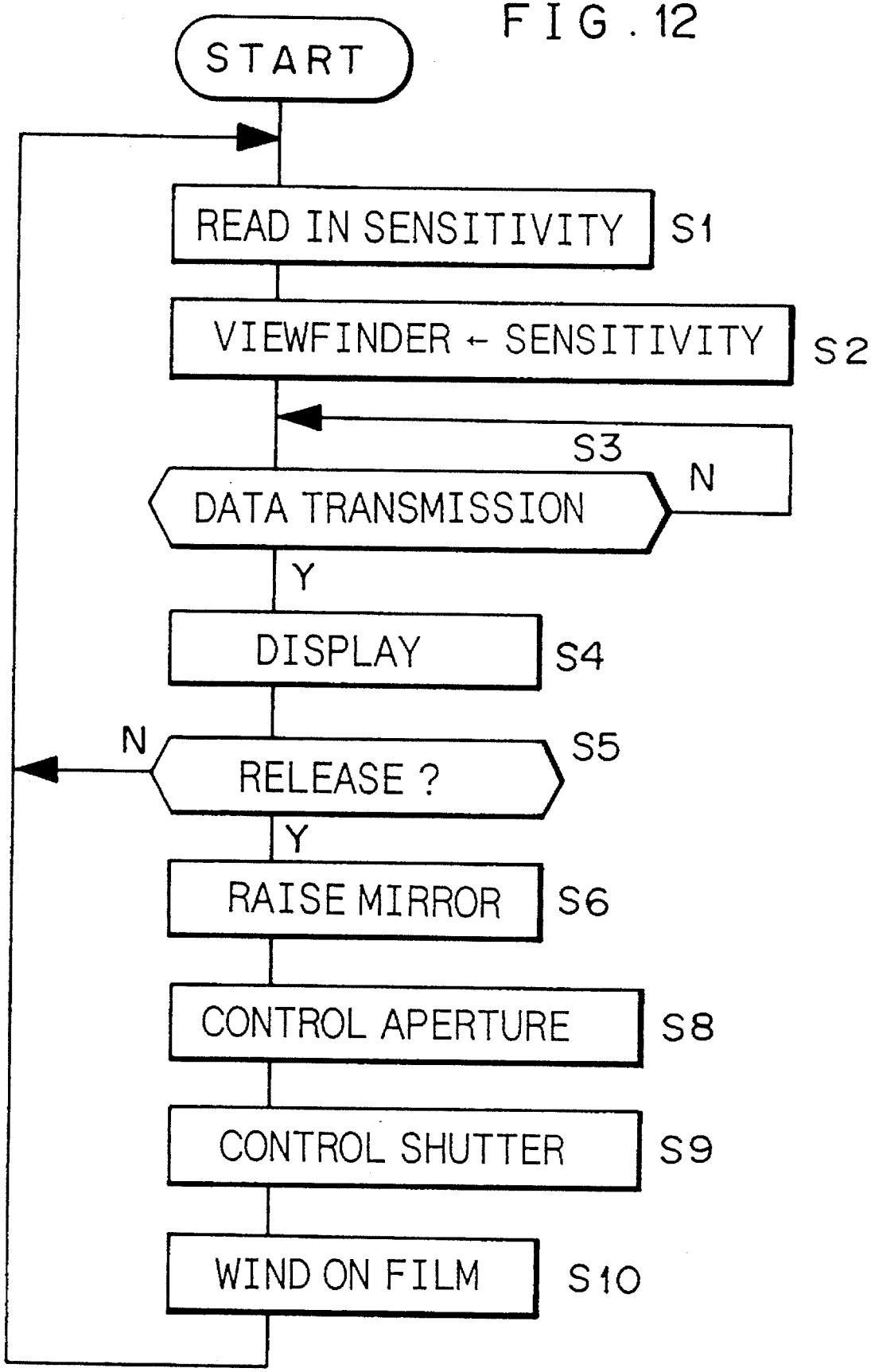

F I G. 15
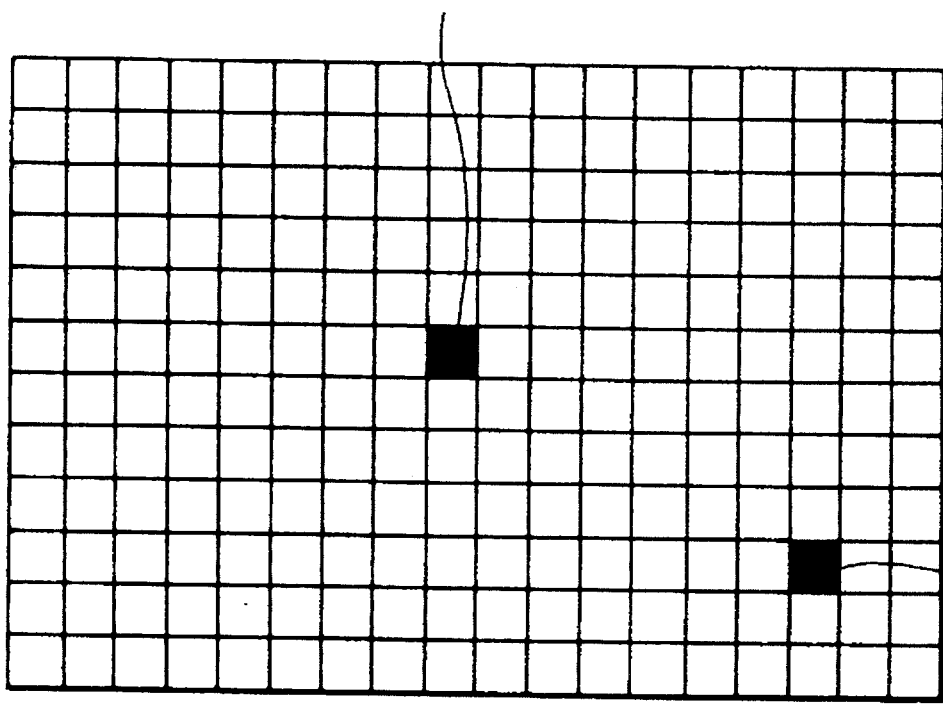

F I G. 16
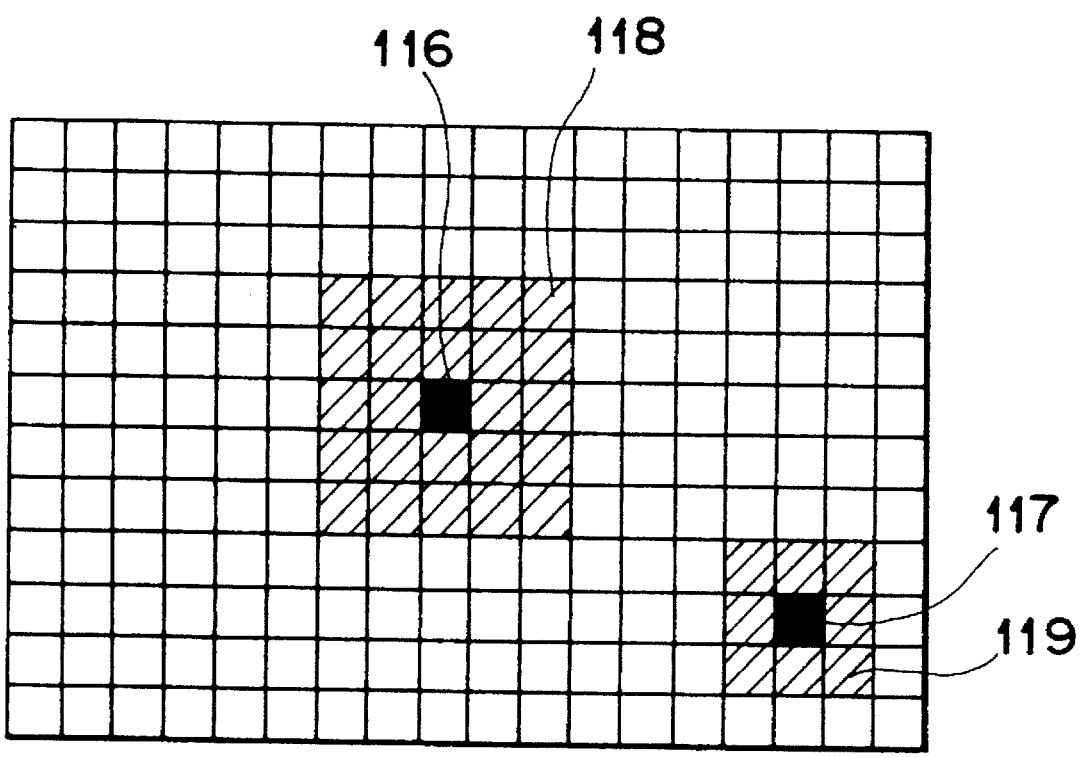

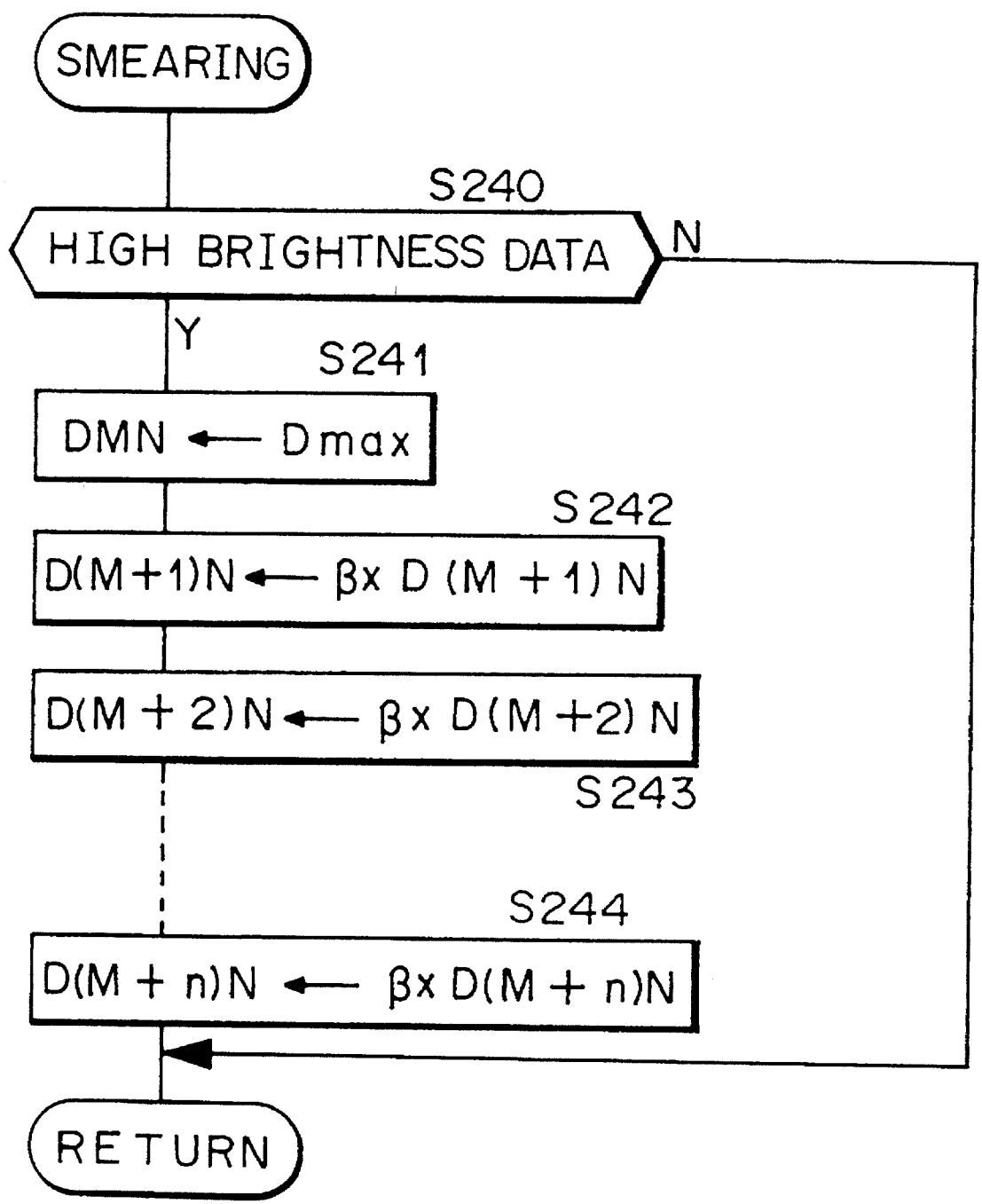

EXPOSURE CALCULATION DEVICE FOR A CAMERA

This is a Continuation of application Ser. No. 08/138,049 filed Oct. 19, 1993, now abandoned.

BACKGROUND OF THE INVENTION

1. Field of the Invention

The present invention relates to an exposure calculation device for a camera which performs photometry on the photographic field and calculates an exposure value with which errors in photometry due to noise and the like are prevented.

2. Description of the Related Art

Recently more and more cameras have been produced which perform a so called divided photometry method. With this divided photometry method, photometry is performed on a plurality of regions into which the photographic field is divided, and a photometric signal according to a brightness for each of these regions is obtained. For this method, the photometric element (a photoelectric conversion element) is divided into a plurality of sub-elements which correspond to the above described plurality of regions on the photographic field. Further, an exposure value is calculated based upon the photometric signals for the various regions, and a shutter time and aperture opening value are determined according to this exposure value, so that photography of the principal object to be photographed can be performed with appropriate exposure settings, without the illumination level of the background exerting any effect.

With this type of divided photometry method, the greater is the number of sub-elements into which the photometric element is subdivided, the greater is the resolution which can be obtained for the distribution of illumination over the principal object to be photographed and the area surrounding it, and accordingly the more appropriate exposure value can be calculated. Therefore in recent years this number of sub-elements has increased, and in the near future it is expected that in some devices the number of sub-elements will be in the range between several tens and several hundreds.

The output from each of the divided sub-elements of the photometric element needs to be amplified by an amplifier for input to a processing circuit, but when the number of sub-elements is in the range of several tens, or even worse, several hundreds, it is a practical impossibility to provide an amplifier for each of the sub-elements, respectively. Therefore in this connection a construction has been conceived of, when for example a charge coupled device (a CCD) which comprises a number of photoelectric conversion sub-elements arranged in a two dimensional array is used as the photometric element, in which the outputs of all the sub-elements are input in series to a single amplifier.

However, when this type of charge coupled device is used, a so called dark current component is present within the photometric signal, and the problem arises that this can cause errors in the photometric process. This dark current is a type of noise component engendered by the construction of the electrical circuitry associated with each sub-element. In particular the relative proportion of this noise component included in the photometric signal becomes great when the value of the photometric signal is relatively small (i.e. when an object to be photographed is relatively dark), so that at this time the errors in the photometric process become large. However with prior art cameras there has been no function for suppression of the noise component included in the photometric signal, and for this reason the problem has arisen that it is not possible to calculate an accurate exposure value. In particular, the higher is the ambient temperature the greater becomes the value of the above described dark current, so that at high temperatures the possibility of performing photography with an exposure value which is inappropriate becomes high.

Further, when a divided type photometric element is made up from silicon photodiodes (SPDs), in conditions of even illumination the output currents generated in the various sub-elements are not necessarily the same, because the sensitivity characteristics typically vary between individual ones of the diodes. For this reason, in order to determine appropriate exposure conditions by calculation based upon the photometric signals output from the various photometric sub-elements, in a ROM or the like a plurality of compensation values corresponding to these various photometric sub-elements are stored so that the non-uniformity of their sensitivity characteristics can be eliminated, and then an exposure amount is calculated after photometric values have been compensated based upon these compensation values. For example, in case that the photometric element is made up from five separate SPDs, if a compensation value of eight bits is provided for each of these separate SPDs, then for storage of these five compensation values it will be sufficient to provide a storing circuit (e.g. a non volatile memory) with a maximum capacity of forty bits.

However, if as described above a photometric element is used which is divided into several tens of sub-elements, since several tens of compensation values are required, a ROM of capacity of at least several hundred bits is required, and accordingly problems arise such as that the size of the package increases and also the cost becomes high. Further, when as is contemplated in the near future the number of sub-elements included in the photometric element comes to be in the range of several hundreds, these problems will become more and more troublesome.

Further, when with the above described type of divided photometry method silicon diodes are used as the photometric element, if light of excessive strength falls upon part of the region of the photometric element, the current generated in this partial region has a tendency to leak over to other neighboring sub-elements of the photometric element, and the problem arises of errors occurring in their proper output. Electric potential barriers are provided between the various regions of the photometric element, in order that electric charge generated in any one region should not leak over to the neighboring regions. However, errors can occur in the detected electric current if the electric charge generated in a partial region of the photometric element on which light of excessive strength has fallen manages to jump over one of these electric potential barriers and leaks to a neighboring region.

The above described type of phenomenon is generally called blooming or smearing according to the circumstances in which it is generated and the like. In such cases the output signal which shows the actual illumination on the portion of the photometric element on which light of excessive strength has fallen or on its neighboring region is corrupted. With a two dimensional sensor of the type used in a video camera or the like, even if this type of blooming occurs, it is possible easily to detect it by observing the monitor image. Therefore it is possible to institute countermeasures such as changing the lens aperture opening value or the like.

However, with a camera for the normal type of film photography, calculations are performed based upon the signals output by the photometric element, and an exposure control value such as the shutter time value or the aperture opening value is only displayed on a display means as a result. Due to this, the problem arises that, even if errors attributable to blooming or the like are present in the signals which are used as inputs for the process of calculation, this cannot be determined until the film is developed.

SUMMARY OF THE INVENTION

The overall objective of the present invention is to provide an exposure device for a camera which is improved so as, by comparison with the prior art, to be able to perform photometry on the object to be photographed more accurately and to calculate a more appropriate exposure value.

A first more detailed objective of the present invention is to provide an exposure device for a camera which is improved so as to be able to calculate an appropriate exposure value while eliminating the noise component from the photometric signals.

A second more detailed objective of the present invention is to provide an exposure device for a camera which is improved so as to be able to calculate an appropriate exposure value while properly eliminating the noise component from the photometric signals, in spite of the temperature conditions in which photography is performed.

A third more detailed objective of the present invention is to provide an exposure device for a camera which is improved so as to be able to adjust for non-uniformities in the sensitivity characteristics of the various divided photometric regions of a divided photometric element, while using a memory device of relatively small capacity.

A fourth more detailed objective of the present invention is to provide an exposure device for a camera which is improved so as to be able to obtain an appropriate exposure value without suffering any adverse influence from blooming or smearing, even in circumstances when a part of the object to be photographed has an extremely high brightness.

The present invention is basically applicable to an exposure calculation device for a camera comprising a photometric means which performs photometry on the light from an object to be photographed and outputs a photometric signal related to the brightness thereof and a calculation means which calculates an exposure value based at least upon said photometric signal output from said photometric means.

And, according to a first construction for the present invention, the exposure calculation device comprises a condition change-over means by which a permission condition in which it permits light from an object to be photographed to reach said photometric means and a prevention condition in which it prevents light from an object to be photographed from reaching said photometric means are switched over, and a storage means which stores a first photometric signal which is output by said photometric means when change to said permission condition is performed by said condition change-over means and a second photometric signal which is output by said photometric means when change to said prevention condition is performed by said condition change-over means, and said calculation means calculates said exposure value based upon the value obtained by subtracting said second photometric signal from said first photometric signal; and thereby the above described problems with the prior art are resolved, and the above described objectives, in particular the first above described more detailed objective, are attained.

That is to say, the first photometric signal is the sum of, not only a component consisting of the unadulterated brightness signal, but also a noise component due to the dark signal or the like, while the value of the second photometric signal can be considered as consisting entirely of a noise component due to the dark signal or the like, since this second photometric signal is the signal obtained when no light is being allowed to fall upon the photometric means. Therefore according to this first construction, by subtracting the second photometric signal from the first photometric signal, the component consisting of the pure and unadulterated brightness signal representing the object to be photographed only remains, and since therefore the exposure value is calculated based upon this unadulterated brightness signal, an appropriate exposure value can be calculated without suffering any influence due to photometric error. Further, in particular with the method of divided photometry, even if there exist individual variations between the photometric characteristics of the different sub-elements, errors arising due to these individual variations are eliminated by the above described subtraction process, and it is possible to calculate an appropriate exposure value.

In particular, according to a first detailed specialization of the first construction, there may further be provided a temperature detection means which detects the temperature in the environs of the camera, and the calculation means may, when the temperature detected by said temperature detection means is less than a certain predetermined temperature, calculate said exposure value based upon said first photometric signal without subtracting said second photometric signal therefrom. Generally, the lower is the temperature, the smaller and the easier to disregard is the noise component due to the dark current, and since therefore at a low temperature there is no need to subtract the second photometric signal from the first photometric signal, according to this construction the unnecessary subtraction process is omitted, and therefore an appropriate exposure value can be calculated quickly and directly.

Further, according to another detailed specialization of the first construction, change to said prevention condition is performed in response to the turning on of power to the camera, and at this time the photometric signal output by said photometric means may be stored in said storage means as said second photometric signal. According to this construction, when the power is turned on the second photometric signal is detected and is stored, and subsequently when taking a photograph the exposure value is calculated using this second photometric signal, and so it is not necessary for every photography to detect the second photometric signal by operation of the condition changeover means.

Further, according to yet another detailed specialization of the first construction: said camera may be a single lens reflex type camera; said photometric means may be provided in a viewfinder; said condition change-over means may include a main mirror which can be switched over between a mirror down position which permits light of an object to be photographed to reach said photometric means and a mirror up position which prevents light of an object to be photographed from reaching said photometric means; and said storage means, when a photograph is being taken and said main mirror is in its said mirror up position, may store the photometric signal output from said photometric means, as said second photometric signal for preparation of the next photograph. According to this construction, it is possible to obtain the second photometric signal by taking advantage of the normal operation of moving the main mirror when taking a photograph.

Further, according to a second construction for the present invention, the exposure calculation device comprises a temperature detection means which detects the temperature in the environs of the camera, and a noise component value detection means which obtains the value of the noise component according to the temperature detected by said temperature detection means; and the calculation means calculates an exposure value based upon the value obtained by subtracting the noise component value obtained by said noise component value detection means from the photometric signal output from said photometric means.

As described above, the noise component due to the dark current and the like included within the photometric signal varies with temperature, and according to this second construction the value of the noise component according to the temperature in the environs of the camera is obtained, so that when taking a photograph it is possible to calculate an exposure value based upon the pure and unadulterated value of the brightness of the object to be photographed without any dependence upon the temperature. Thereby it is possible to calculate an appropriate exposure value without suffering any influence from photometric errors, and further, since it is not necessary to obtain the value of the noise component by operating the condition change-over means, the calculation of the exposure value can be performed quickly and easily.

Further, according to a detailed specialization of the second construction, said noise component value detection means may comprise a noise component value storage means which stores a plurality of values of the noise component in said photometric signal as previously determined in accordance with a plurality of temperatures, and the noise component value may be read out from said noise component value storage means according to the temperature detected by said temperature detection means.

Further, according to a third construction for the present invention, the exposure calculation device comprises a photometric means which are divided into a plurality of regions so as to perform photometry on the light from an object to be photographed and, for each of said regions, outputs a photometric signal related to the brightness of said region, and a calculation means comprises a classification means which quantizes at a predetermined resolution the photometric signals obtained by performing photometry upon an object having a uniform brightness, and then classifies said plurality of regions into a plurality of groups of regions each having the same quantized photometric signal value, and a storage means which, for each of said groups of regions classified by said classification means, stores one compensation value corresponding to the magnitude of said photometric signal; said calculation means compensates according to said compensation values the photometric signals obtained by performing photometry by said photometric means for an object to be photographed, and calculates an exposure value based upon said photometric signals after compensation.

Since according to this third construction it is possible to make the number of compensation values, which is used for quantization of the deviations of sensitivity characteristic between the individual regions in the plurality of regions of the photometric means, smaller than the total number of such regions, thereby it is possible to compensate for variation of sensitivity characteristic between the plurality of regions of the photometric means using a memory means which has a smaller memory capacity, and accordingly it is possible to ameliorate or entirely to dismiss the previously mentioned problems of excessive size and high cost associated with the memory means.

In particular, according to a detailed specialization of the third construction, said classification means may calculate the difference between each of said photometric signals and the average value of the photometric signals from said photometric means for all of said plurality of regions, and may then classify into the same group of regions all of said regions for which said difference is substantially identical, and for each of said groups of regions said storage means may store said difference as said one compensation value.

Further, according to a fourth construction for the present invention, a photometric means is constructed such that it performs photometry on a plurality of divided regions to which the light from an object to be photographed is incident and, for each of said regions, outputs a photometric signal related to the brightness of said region. A calculation means comprises a compensation means which decides whether or not said plurality of photometric signals includes an excessive value signal having a brightness higher than a predetermined value, and, when said plurality of photometric signals does include such an excessive value signal having a brightness higher than a predetermined value, performs compensation by reducing the values of said excessive value signal and of the signals from a plurality of regions in the neighborhood of the region corresponding to said excessive value signal by predetermined amounts. The calculation means calculates an exposure value based upon the values of said photometric signals after compensation by said compensation means.

According to this fourth construction for the present invention, it is possible to determine an appropriate exposure value, even in conditions when blooming or smearing might be generated because the object to be photographed contains one or more regions of extremely high brightness, so that an influence might be transmitted from the region of the photometric means corresponding to said extremely high brightness region to regions neighboring thereon. Thereby it is possible to avoid the problem which occurred with the prior art that in this type of circumstances photography might be performed using an exposure value which has been inappropriately calculated, due to the use of photometric signals which have been corrupted emanating from regions of the photometric means surrounding said region extremely high brightness region thereof.

In particular, according to a detailed specialization of the fourth construction, said compensation means is constructed such that it performs compensation by reducing the value of said excessive value signal having a brightness higher than said predetermined value and the values of the signals from a plurality of regions surrounding the region corresponding to said excessive value signal; and by doing this the problem of blooming may be reduced or even may be prevented.

Or, according to another detailed specialization of the fourth construction, said compensation means is constructed such that it performs compensation by reducing the value of said excessive value signal having a brightness higher than said predetermined value and the values of the signals from at least a plurality of regions extending along a single predetermined direction from the region corresponding to said excessive value signal; and by doing this the problem of smearing may be reduced or even may be prevented.

And, according to yet another detailed specialization of the fourth construction, said compensation means is constructed such that it replaces the value of said excessive value signal having a brightness higher than said predetermined value with a predetermined value which is less than said threshold value.

And, according to yet another detailed specialization of the fourth construction, said compensation means is constructed such that it performs compensation to reduce the values of said signals from said plurality of regions in the neighborhood of the region corresponding to said excessive value signal having a brightness higher than said predetermined value by multiplying them by a predetermined compensation coefficient which is less than unity.

And, according to a yet more detailed specialization of the detailed specialization of the fourth construction, the closer is one of said regions in the neighborhood of the region corresponding to said excessive value signal having a brightness higher than said predetermined value to said excessive value signal region, the smaller is its said compensation coefficient.

BRIEF DESCRIPTION OF THE DRAWINGS

FIG. 12 is a flow chart showing a control sequence of the side of the camera body according to the third preferred embodiment of the present invention;

FIG. 15 is a figure showing a detection result of an object image detecting by the photometry sensor under the normal brightness condition;

FIG. 16 is a figure showing a detection result of an object image when occurring blooming phenomenon due to the high brightness object;

FIG. 21 is a flow chart showing a compensation process for smearing in the step S221 of the FIG. 19.

DESCRIPTION OF THE PREFERRED EMBODIMENTS

In the following, some preferred embodiments of the present invention will be described in detail with reference to the appended drawings.

Embodiment 1

Figure 1:
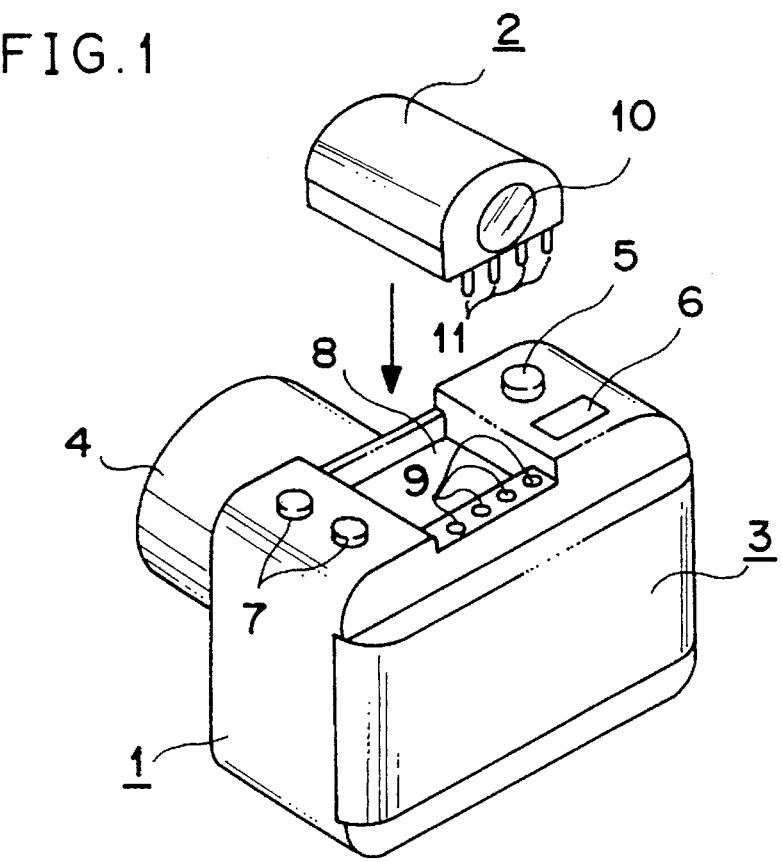
FIG. 1 is a perspective view of a camera provided with the exposure calculation device for a camera according to the present invention.

FIG. 1 is a perspective view as seen from the rear showing the outside of a single lens reflex camera to which the first preferred embodiment has been applied. The reference numeral 1 denotes the main body of the camera, and 2 denotes a detachable viewfinder which can be attached to and separated from a screen portion 8 on the upper surface of the camera body 1, while 3 denotes a rear lid provided on the rear surface of the camera body 1 which can be opened and closed and 4 denotes a detachable photographic lens which can be attached to and separated from the front surface of the camera body 1. On the upper surface of the camera body 1 there are provided a release button 5, a liquid crystal display 6, and setting buttons 7. The setting buttons 7 are for setting the selection of photometric mode or exposure mode or film forwarding mode or the like.

Figure 2:
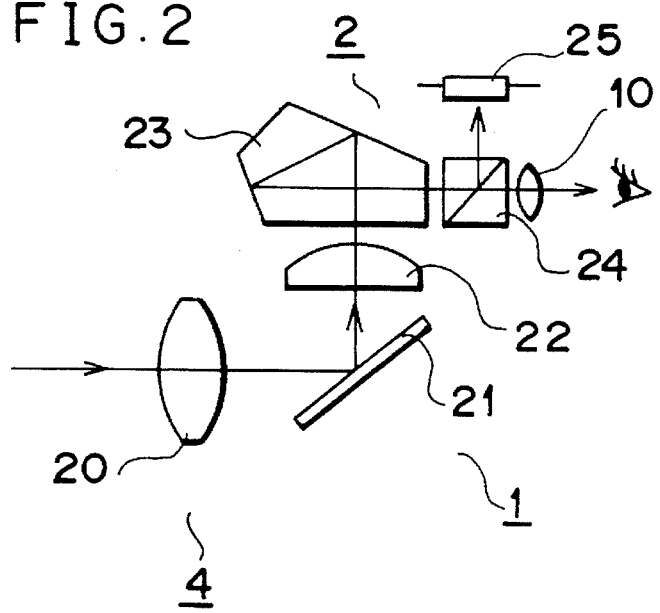
FIG. 2 is a figure showing a light path of an object to be photographed.
Figure 5:
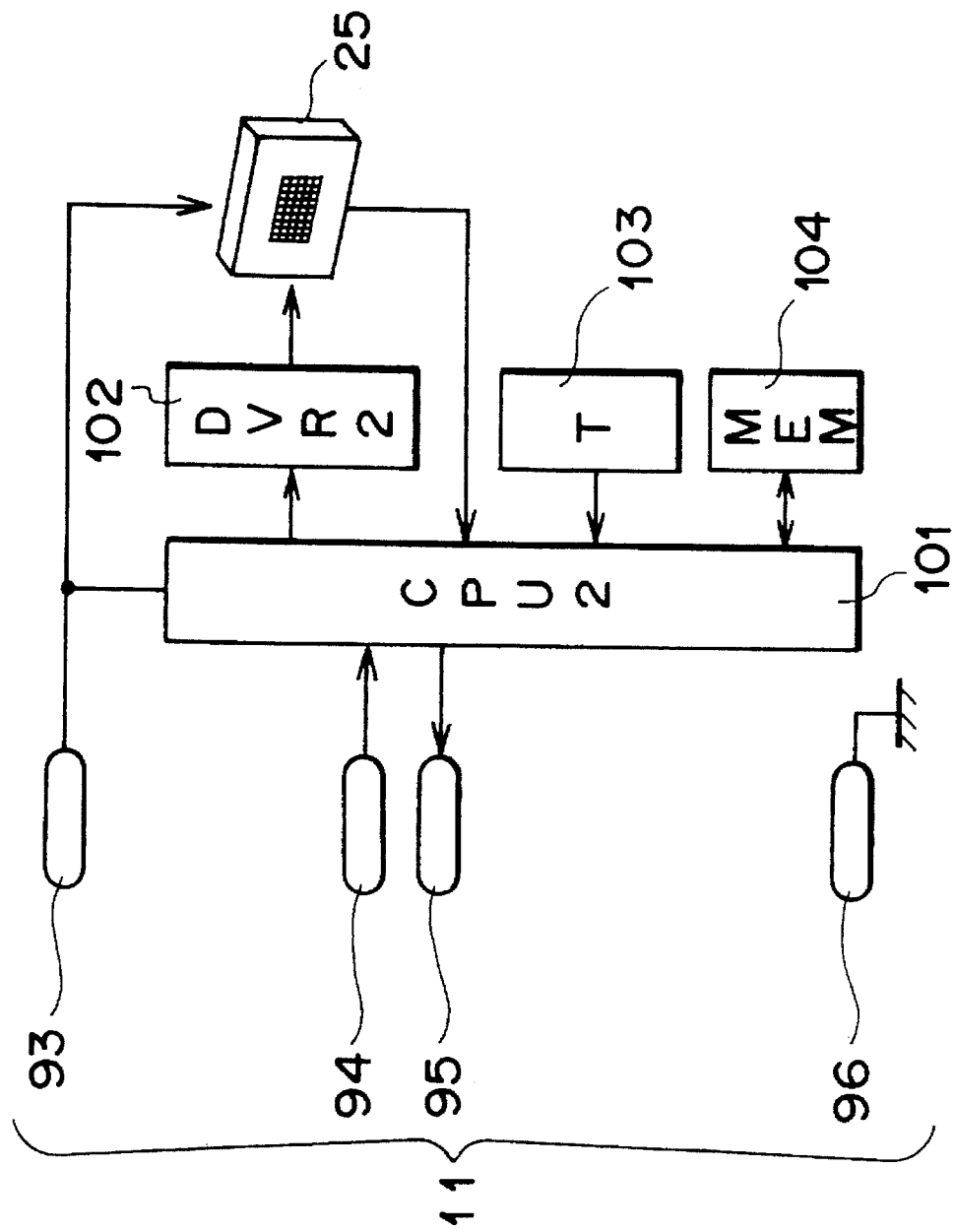
FIG. 5 is a block diagram showing circuitry provided within the viewfinder.

The viewfinder 2 comprises an eyepiece section 10 which is used to view the object to be photographed, a photometric sensor 25 which is shown in FIG. 2 and an electrical circuit which is shown in FIG. 5. When this viewfinder 2 is fitted to the screen portion 8, the contacts of a contact group 11 comprised in this electrical circuit are brought into contact with the contacts of a contact group 9, and thereby the circuitry in the viewfinder 2 is brought into electrical communication with circuitry in the camera body 1.

FIG. 2 is a figure showing a light beam from the object to be photographed which passes through the photographic lens 4, the camera body 1, and the viewfinder 2. The reference numeral 20 denotes an optical system which is provided within the photographic lens 4. The light beam from the object to be photographed which has passed through this optical system 20 is reflected in the upward direction from a main mirror 21 in the camera body 1, and this reflected light beam is focused upon a screen 22 incorporated in the screen portion 8. After this focused light of the object to be photographed has been transmitted to a half silvered mirror 24 via a pentaprism 23, a portion thereof passes through the half silvered mirror 24 to reach the eyepiece section 10, while another portion thereof is reflected in the upward direction to reach a photometric sensor 25.

Although the main mirror 21 is shown as being in its down position, in a per se known manner this main mirror 21 is raised to its up position at the time of actual photography, so that at this time point the light of the object to be photographed which has passed through the optical system 20 is transmitted to the film side and no light is transmitted to the screen 22. In detail, when the main mirror 21 is in its down position, it allows the light from the object to be photographed to be conducted to the photometric sensor 25, while on the other hand when the main mirror 21 is in its up position, it interrupts the conduction of the light from the object to be photographed to the photometric sensor 25.

Figure 3:
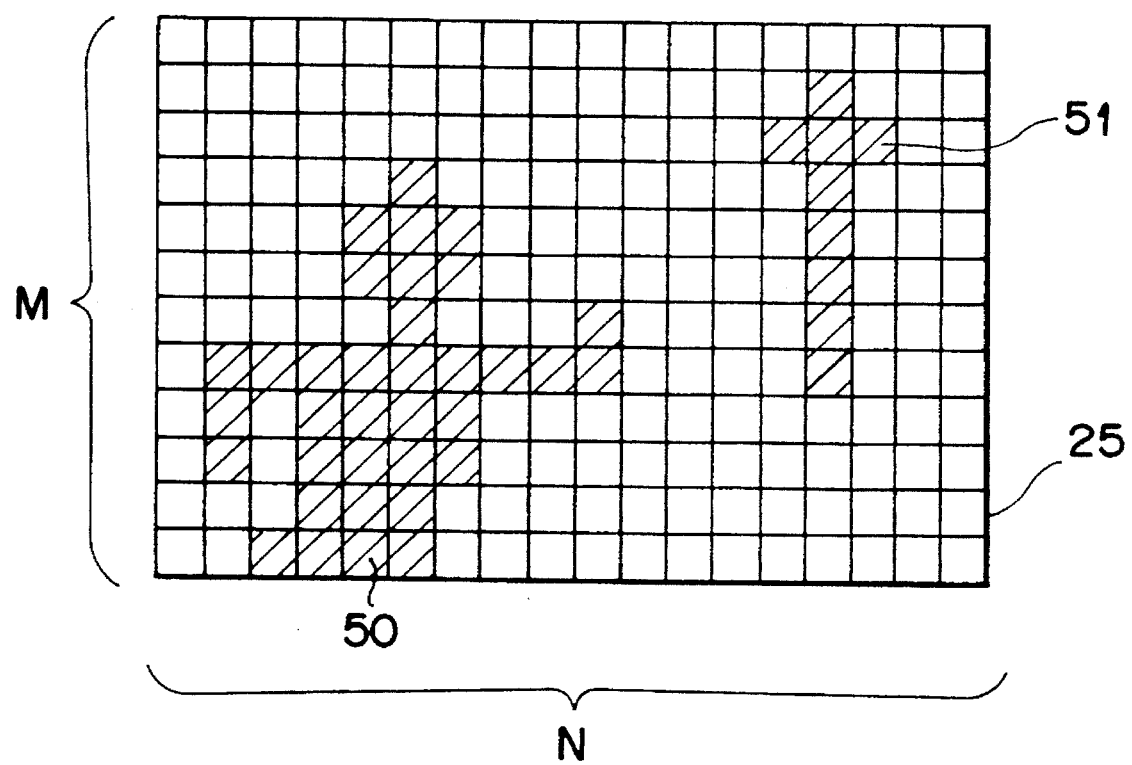
FIG. 3 is a figure showing an example of how a photometric sensor is divided into.

The photometric sensor 25 of this first preferred embodiment comprises a silicon-photo-diode converting incident light to an electric and a CCD (charge coupled device) accumulating an electric charge obtained by the silicon-photo-diode. As shown in FIG. 3, the photometric sensor 25 comprises a total of M×N sub-elements arranged in the form of a matrix which has M rows and N columns. Each of the sub-elements receives light rays directed upon it as described above and performs photoelectric conversion, and outputs a photometric signal relating to the illumination of the object to be photographed. In other words, in this first preferred embodiment, the photometric sensor 25 performs photometry M×N regions individually into which the entire photographic field is hypothetically divided. The photometric signals from these sub-elements are read out in time series according to a predetermined clock signal, and are input as digital signals to a CPU 101 which is shown in FIG. 5. In FIG. 3, the symbols 50 and 51 denote images of objects which are of lower luminance value than the surrounding portions of the photographic field (of smaller photometric signal value) and which are therefore shown by diagonal hatching. FIG. 3 schematically shows the photographic field as being mapped with only two brightness steps, i.e., bright and dark, but actually it may detect the brightness with three or more steps, or detect information related to the hue of an object to be photographed.

Next, electrical circuitry incorporated in the camera body 1 and in the viewfinder 2 will be explained.

Figure 4:
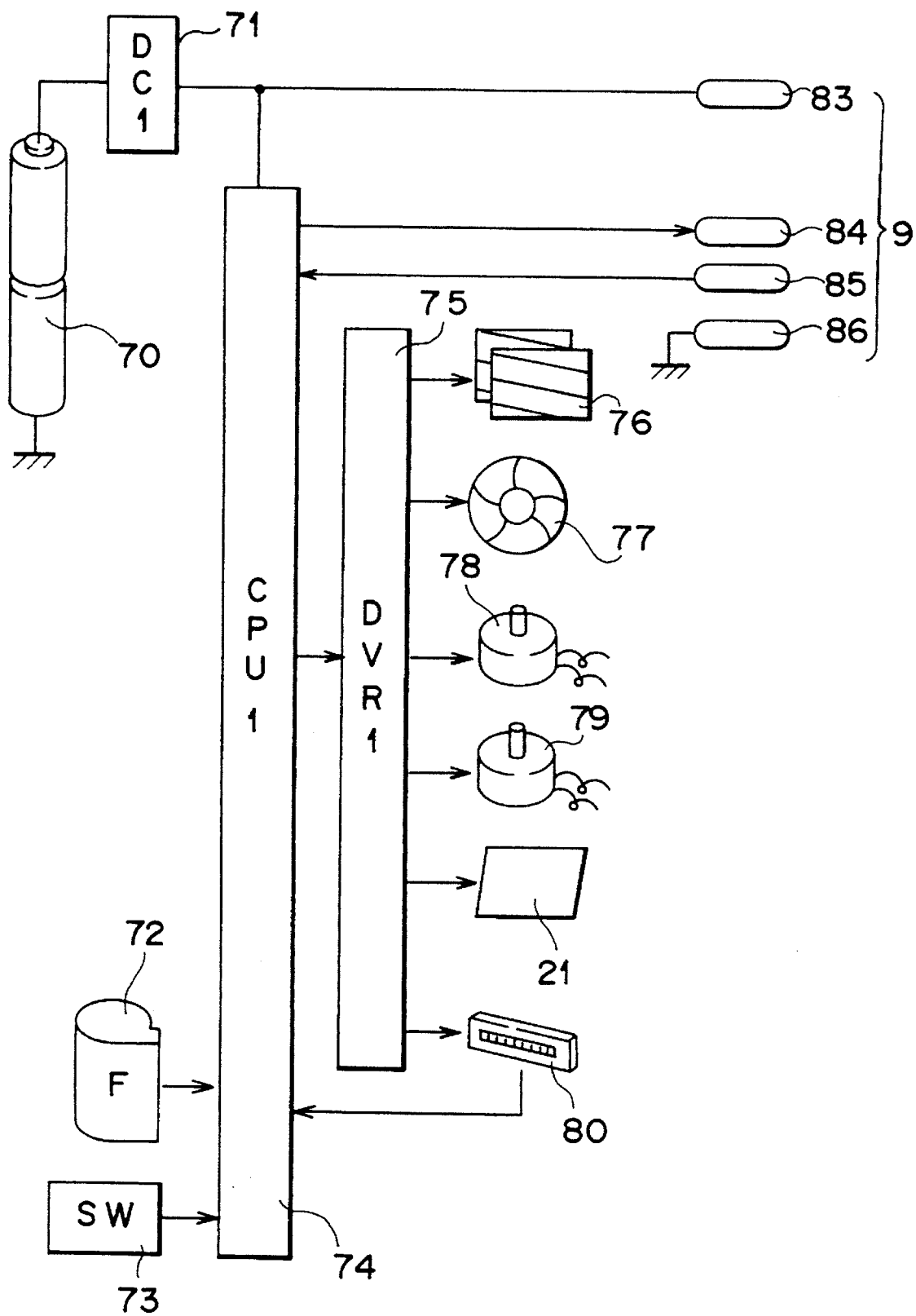
FIG. 4 is a block diagram showing circuitry provided within the body of the camera.

FIG. 4 is a block diagram showing circuitry within the camera body 1. Actuating electrical energy is supplied from a battery 70 via a DC/DC converter 71 to all of this FIG. 4 circuitry, and is also supplied to the circuitry in the viewfinder 2 (see FIG. 5) via a contact 83. The contact group 9 (see FIG. 1) is made up of four contacts denoted as 83 through 86, and when the viewfinder 2 is fitted to the camera body 1 these contacts 83 through 86 come into respective contact with the contact group 11 provided on the viewfinder 2.

The reference numeral 74 denotes a control circuit (hereinafter referred to simply as a CPU) which comprises a CPU, ROM, RAM, etc. and which performs overall sequencing of this camera. This CPU 74 on the one hand inputs the exposure value calculated by the circuitry in the viewfinder 2 via the above described contact 85, and on the other hand outputs the film ISO sensitivity (as described hereinafter) and the up/down condition of the main mirror 21 to the circuitry in the viewfinder 2 via the contact 84. Further, to the CPU 74 there is also connected the circuitry described hereinafter.

The reference numeral 72 denotes a film sensitivity detection circuit, which detects the ISO sensitivity of the film loaded into this camera and inputs a signal representative thereof to the CPU 74. And 73 denotes a switch group which comprises a plurality of switches and which inputs to the CPU 74 a signal representative of the ON/OFF states of these switches. These switches may include, for instance, a first stroke switch which is turned ON when the release button 5 described above is partially depressed, a second stroke switch which is turned ON when the release button 5 described above is further fully depressed, a mirror position detection switch which is turned ON when the main mirror 21 is in its up position and is turned OFF when the main mirror 21 is in its down position, setting switches which are turned ON and OFF in accordance with the operation of the setting buttons 7, and the like.

Further, the CPU 74 is connected via a drive circuit 75 to a shutter 76, an iris 77, a film forwarding motor 78, a focusing motor 79, a focus detection element 80, and the above described main mirror 21. The CPU 74 drives the focusing motor 79 based upon the output signal from the focus detection element 80 so as to perform focusing action, raises and lowers the main mirror 21, drives the iris 77 and the shutter 76 based upon the exposure value as calculated on the side of the viewfinder 2 and performs exposure action, and drives the film forwarding motor 78 so as to perform film winding on or rewinding action. Further, although no corresponding structures are particularly shown in the figures, the CPU 74 also outputs a control signal for illumination of a lamp for causing the pupils of humans to be photographed to contract (i.e. for reducing the so called red eye phenomenon), a signal for controlling a supplementary illumination lamp for illuminating the object to be photographed with supplementary light in a predetermined pattern in low illumination conditions in order to augment the focus detection function, and the like, and also drives the liquid crystal display 6 provided on the upper surface of the camera body 1.

FIG. 5 is a block diagram showing circuitry within the viewfinder 2. A CPU 101 drives the photometric sensor 25 via a drive circuit 102, and inputs the photometric signal which the photometric sensor 25 outputs. This photometric signal is temporarily stored in a storage circuit 104, and when required is read out by the CPU 101 and is used for calculating exposure value. The calculated exposure value is sent to the main body 1 of the camera via the contact 95. The reference numeral 103 denotes a temperature sensor which senses the ambient temperature in the vicinity of the camera, and which sends a signal representative of said detected ambient temperature T to the CPU 101.

In the following, the operation of this first preferred embodiment will be explained with reference to the flow charts shown in FIGS. 6 through 8.

Figure 6:
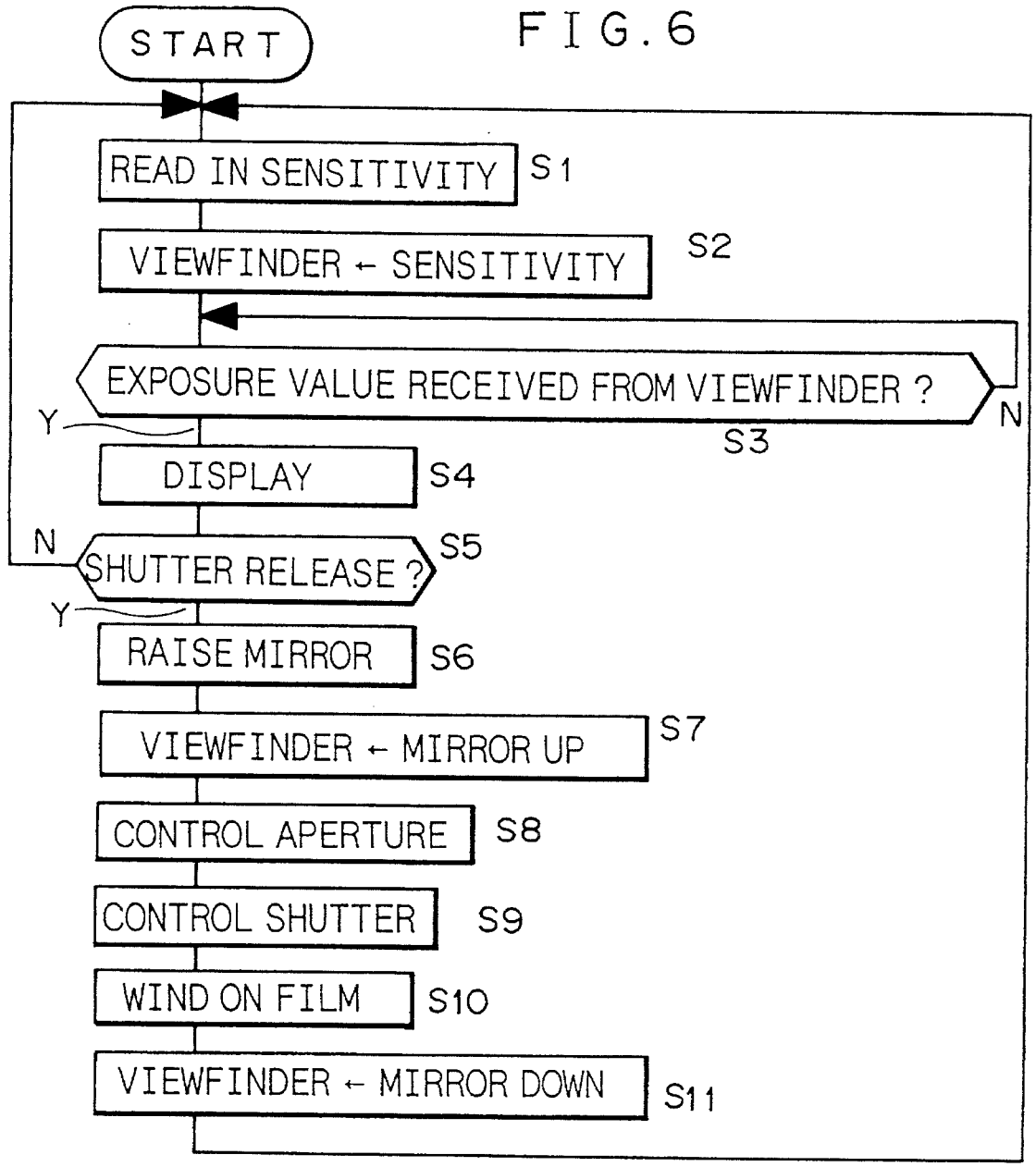
FIG. 6 is a flow chart showing a control sequence of the side of the camera body according to the first preferred embodiment of the present invention.

FIG. 6 shows the control sequence for the CPU 74 incorporated in the camera body 1. A program for this control sequence is started, for example, when the above described first stroke switch included in the switch group 73 is turned ON. First, in the step S1, the ISO sensitivity value of the film is detected by the film sensitivity detection circuit 72 and next in the step S2 the detected film sensitivity value is transferred to the viewfinder side via the contact 84. In the step S3, the flow of control waits until an exposure value is received from the viewfinder side, and when the exposure value is received the flow of control passes to the step S4. In the step S4, the aperture opening value and shutter speed calculated on the basis of the exposure value are displayed, on the liquid crystal display 6. In the step S5, a decision is made as to whether or not the above described second stroke switch included in the switch group 73 is turned ON, and if the result of this decision is NO then the flow of control returns to the step S1, while if the result of this decision is YES then the flow of control passes to the step S6.

In the step S6, the main mirror 21 is raised. When the above described mirror position detection switch is turned ON in response to a mirror up of the mirror 21, and then in the next step S7 the CPU 74 sends a mirror up signal to the viewfinder side via the contact 84. Next the CPU 74 controls the iris 77 via the drive circuit 75, in the step S8, so as to set it to the calculated aperture opening value, and, in the step S9, it controls the shutter 76 so as to open and close it according to the calculated shutter speed. Next the CPU 74 controls the film forwarding motor 78, in the step S10, so as to wind on the film by one frame. Therefore, in the step S11, it lowers the main mirror 21. When the main mirror 21 moves to its lowered position, the above described mirror position detection switch is turned OFF, and the CPU 74 sends a mirror down signal to the CPU 101 on the viewfinder side via the contact 84. When the step S11 is completed, the flow of control returns to the step S1. And, when the above described first stroke switch is turned OFF, the execution of this program stops.

Figure 7:
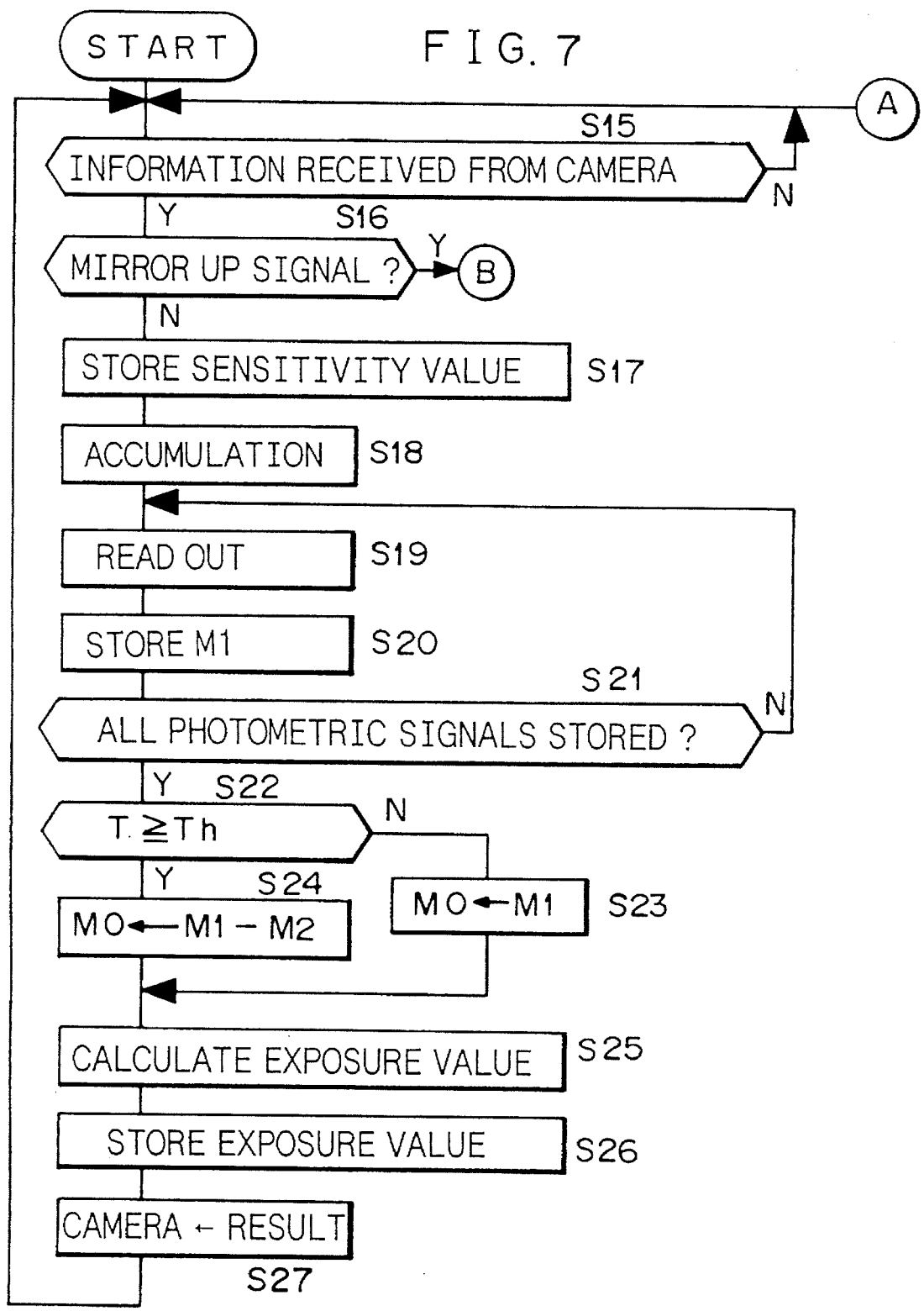
FIG. 7 is a flow chart showing a control sequence of the side of the viewfinder according to the first preferred embodiment of the present invention.
Figure 8:
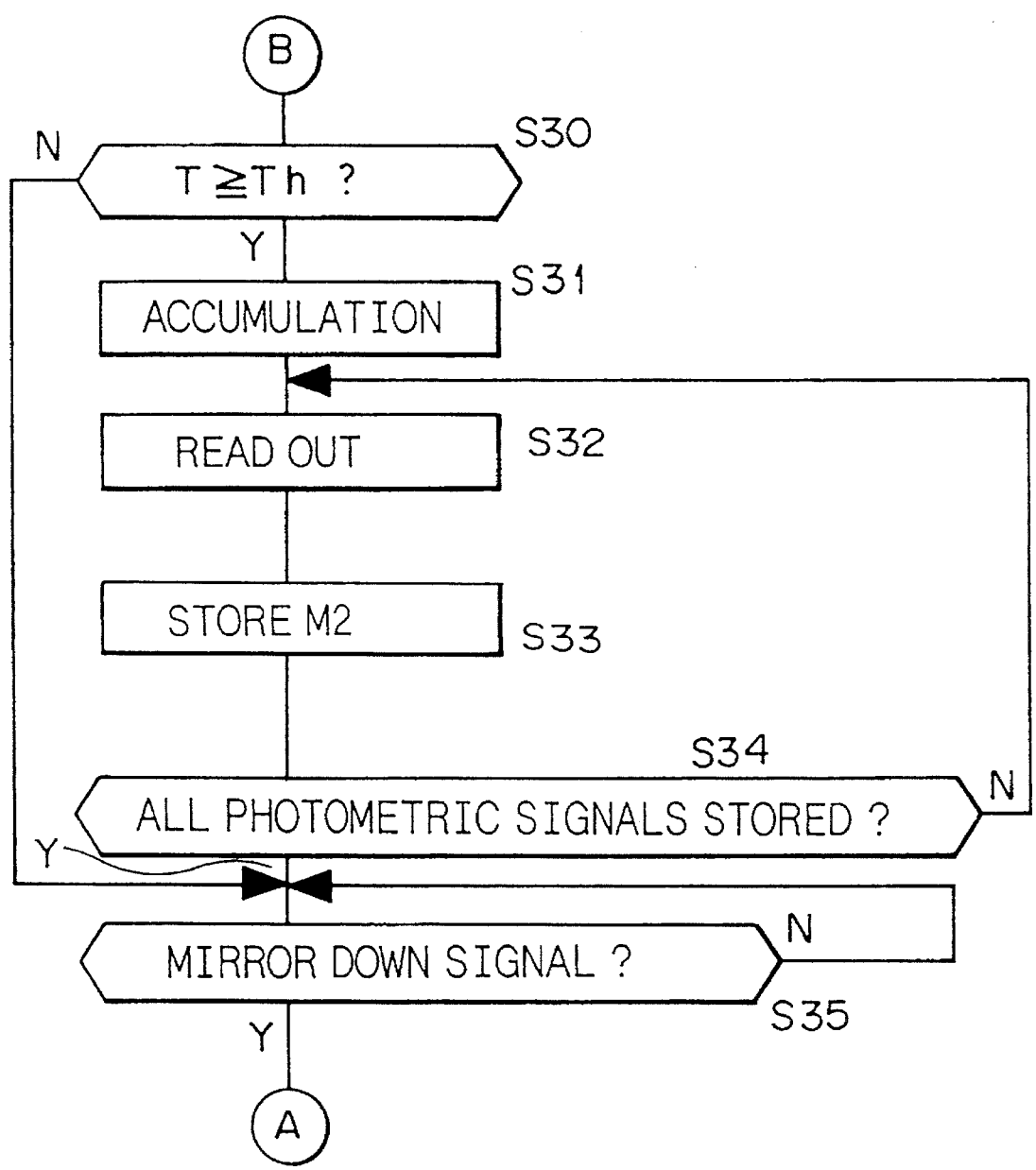
FIG. 8 is a continuation of the FIG. 7 flow chart.

FIGS. 7 and 8 together show a control sequence for the CPU 101 incorporated in the viewfinder 2. This program for control sequence is always continually executed as long as power continues to be supplied.

First, in the step S15, the flow of control waits until information of the ISO sensitivity of the film or the mirror up signal is received from the camera body 1. When any one of the information and the signal has been received the flow of control passes to the step S16. In the step S16, when a decision is made that the information thus inputted is not the mirror up signal, namely the film sensitivity information is inputted in the step S17, the sensitivity value of the film is stored in the storage circuit 104. Next, in the step S18, the accumulation operation of the photometric sensor 25 is started, and the light from the object to be photographed received on each of its sub-elements as shown in FIG. 3 is converted into electric charge. In the step S19, a photometric signal is read out. That is, one of the above described accumulated electric charges is read out as an electrical photometric signal according to the supply of a predetermined clock signal, and is input in time series to an A/D converter within the CPU 101. This A/D converter converts the input photometric signals one by one into digital signals. In the step S20, the photometric signal converted into the digital signal described above is stored in the storage circuit 104. The set of digital photometric signals stored at this time will be termed the first photometric signals M1.

The steps S19 and S20 are repeated until a decision is made that all of the M×N photometric signals are stored. When all of M×N photometric signals have been stored, the flow of control passes to the step S22. In this step S22, the temperature value T detected by the above described temperature sensor 103 is read in and is compared with a predetermined temperature value Th. If T<Th then the flow of control passes to the step S23 in which the above described first set M1 of M×N photometric signals is stored as the photometric signal set M0 for calculation of an exposure value, and the flow of control passes to the step S25. On the other hand, if T≧Th then the flow of control passes to the step S24, in which a second set M2 of photometric signals which was obtained for the last time photography was performed (and the method of obtaining which will be described hereinafter) is subtracted from the above described first set M1 of M×N photometric signals and the result is stored as the photometric signal set M0 for calculation of an exposure value, and then the flow of control passes to the step S25. In the above described subtraction, for each of the photometric sub-elements included in the photometric sensor 25, the one of the second set of photometric signals M2 relating to that sub-element is subtracted from the one of the first set of photometric signals M1 relating to that same sub-element, so that the photometric signal set M0 for exposure value calculation is comprised of a M×N signals.

In the step S25, an exposure value is calculated based upon the photometric signal set M0 and upon the above described input film sensitivity information, and next in the step S26 this calculated value is stored in the storage circuit 104. And in the step S27 this recorded exposure value is transferred to the camera side. After this the flow of control returns to the step S15, and the above described process is repeated.

On the other hand, if in the above described step S16 it is determined that the information which has been received from the camera is the mirror up signal, then the flow of control passes to the step S30 in the FIG. 8 flow chart. In this step S30, the temperature value T detected by the temperature sensor 103 is compared with the predetermined temperature value Th, and if T<Th then the flow of control passes to the step S35, while if T≧Th then the flow of control passes to the step S31. In the steps S31 through S34, identical processes are performed to the steps S18 through S21 described above respectively. Thus a set of M×N photometric signals is stored in the storage circuit 104 as the second set of photometric signals M2. In the step S35, the flow of control waits until the mirror down signal is received from the camera side, and after this signal is received the flow of control passes to the step S15 in the FIG. 7 flow chart.

According to the processes described above and shown in the flow charts of FIGS. 6 through 8, when the first stroke switch is turned ON, photometry is performed when the main mirror 21 is in its down position, and the set of photometric signals obtained at this time is recorded in the storage circuit 104 as the first set of photometric signals M1. On the other hand, the second set of photometric signals M2 which was obtained as a dark current component previously while the main mirror 21 was in its up position when the previous photograph was being shot is already stored in the storage circuit 104 at this time. If the temperature value T detected by the temperature sensor 103 is greater than or equal to the standard temperature value Th then the photometric values obtained by subtracting this second set M2 of photometric signal values from the first set M1 of photometric signal values are used as the photometric signal set M0 for exposure value calculation. And an exposure value is calculated based upon this photometric signal set M0 and upon the detected film sensitivity value, and when the second stroke switch comes to be turned ON photography is performed using this exposure value.

The above described first set M1 of photometric signal values is composed of a component indicating the actual illumination of the object to be photographed, and noise due to the dark current and the like. On the other hand, the second set M2 of photometric signal values consists of the photometric signals obtained when the main mirror 21 is in its up position, i.e. obtained when no light from the object to be photographed is being cast upon the photometric sensor 25, and therefore the values of these photometric signals can be considered as consisting entirely of noise due to the dark current and the like. Accordingly the component consisting of the pure brightness values only can be obtained by Subtracting the second set M2 of photometric signal values from the first set M1 of photometric signal values so as to obtain the photometric signal set M0. Since in this embodiment the exposure value is calculated based upon this component of the pure brightness values it is possible to obtain an appropriate exposure value without suffering any influence from errors in photometry.

If the temperature value T detected by the temperature sensor 103 is less than the standard temperature value Th, then the exposure value is directly calculated based upon the first set M1 of photometric signal values and the ISO sensitivity of the film, without using the second set M2 of photometric signal values. This is done because the noise component due to the dark current when the temperature is relatively low is so small that it can be disregarded, and therefore in this case it is possible to calculate an appropriate exposure value even without performing the unnecessary operation of subtracting the second set M2 of photometric signal values from the first set M1 of photometric signal values.

Further, with this embodiment, even if the characteristics (the sensitivities) of the various sub-elements incorporated in the photometric sensor 25 vary between one another, since the photometric signal value set M0 is calculated by subtracting the second set M2 of photometric signal values from the first set M1 of photometric signal values, therefore errors due to variation between the sensitivity characteristics of the various sub-elements are eliminated, so that the photometric signal set for exposure value calculation can be available as the sub-elements are considered to have exactly the same sensitivity characteristics. This matter will be explained further with reference to FIGS. 9A and 9B.

Figure 9A:
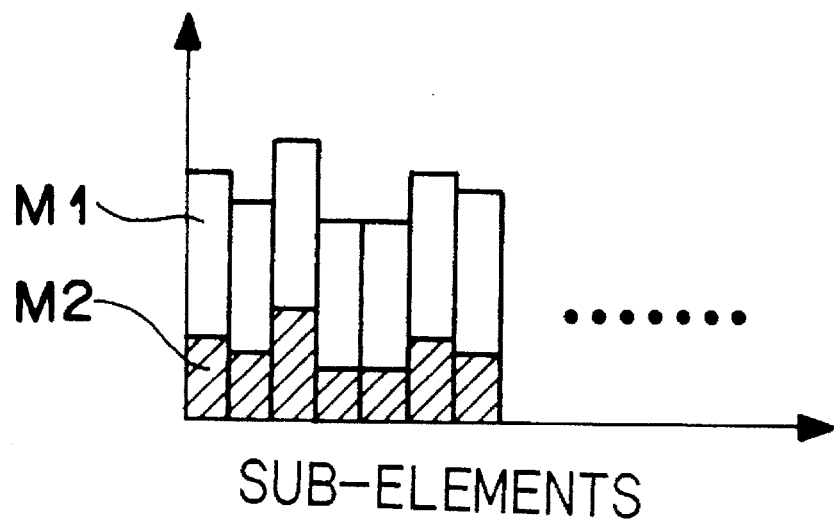
FIGS. 9A and 9B are figures for explanation of the principle of elimination of errors due to variation in the characteristics of the various sub-elements incorporated in the photometric sensor.
Figure 9B:
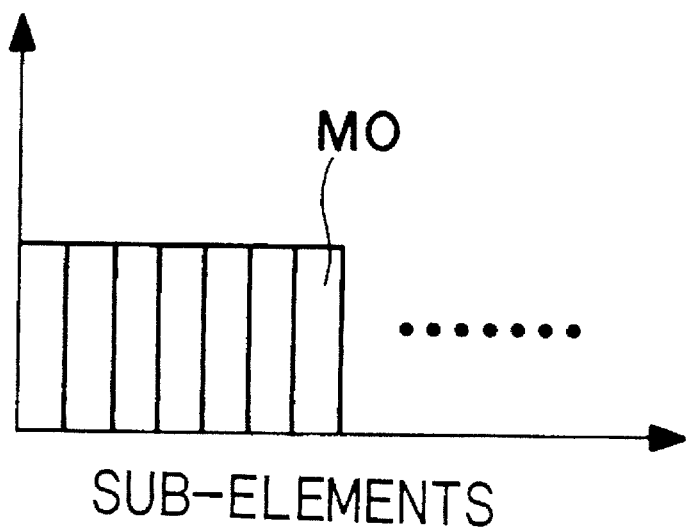

The bars M1 in FIG. 9A show the first set M1 of photometric signals output from the various sub-elements which are obtained when the object to be photographed has a uniform brightness. As will be understood from this figure, because of the noise component due to the dark current and of deviation between the sensitivity characteristics of the different sub-elements, even though the object to be photographed has a uniform brightness, the first set M1 of photometric signals are not uniform but differ somewhat from one another. Further, in the same manner, the bars M2 in FIG. 9A show the second set M2 of photometric signals which are obtained from the various sub-elements, which is equal to the alterations in the first set M1 of photometric signal values due to the dark signal noise component and due to variation in sensitivity characteristics between the various different sub-elements. The bars M0 in FIG. 9B show the photometric signal set M0 for exposure value calculation obtained by subtracting the second set M2 of photometric signals from the first set M1 of photometric signals. It will be understood that with this set M0 of signals there has been eliminated by this subtraction operation, not only the noise component, but also errors due to variation in sensitivity characteristics between the various different sub-elements, so that all of the signal levels have been brought to exactly the same value. In this manner, even if there is variation in sensitivity characteristics between the various different sub-elements, it is possible to obtain the photometric signal set M0 for exposure value calculation at uniform sensitivity, so that it is possible to calculate an accurate exposure value.

It would also be acceptable always to perform the operation of subtraction of the second set M2 of photometric signals from the first set M1 of photometric signals with no dependence upon the temperature T. In particular, if the above described variation in sensitivity characteristics between the various sub-elements of the photometric sensor 25 is relatively large, it is desirable always to perform this subtraction operation.

Further, in the above described first preferred embodiment, the second set M2 of photometric signals is obtained each time a photograph is taken, i.e. when the mirror interrupts the light from the object to be photographed and this second set M2 of photometric signals is stored, and is subsequently used for calculating the exposure value when the next photograph is to be taken. However, it would also be acceptable for the main mirror 21 to be raised to its up position when (for example) the power for the camera is first turned on, and for the photometric signals input from the photometric sensor 25 at this time to be stored as the second set M2 of photometric signals, which is thereafter used for calculation of exposure value for all subsequent photographs taken. Alternatively it would also be acceptable, each time the first stroke switch is turned ON, for the main mirror 21 to be raised and lowered once, and the second set M2 of photometric signals from the photometric sensor 25 obtained during the raised mirror is stored and is used for an exposure value calculation.

Yet further, in the case of a camera which is equipped with an eyepiece shutter, measurement errors in the dark current can be caused as a result of the amount of light reflected from the eyepiece of the viewfinder when the mirror is up being large. Therefore, if the eyepiece is covered by the eyepiece shutter being operated as the mirror is raised to its up position, and the above described light reflected from the eyepiece is intercepted, then more accurate exposure value can be calculated.

The light interception means is not to be considered as being limited to a mirror. For example, with a camera equipped with a lens barrier with which the front surface of the photographic lens can be covered, it would also be acceptable to intercept the light from the photographic field from falling upon the photometric sensor 25 by the use of this lens barrier. Also, in the case of a camera of the so called external photometric type in which the light from the object to be photographed which reaches the photometric sensor passes through an optical system which does not include the photographic lens, a light interception member should be provided within this optical system.

Embodiment 2

The second preferred embodiment according to the present invention will be explained with reference to FIG. 10.

In the above described first preferred embodiment, as an example, the photometric signal when no light from the object to be photographed was being cast upon the photometric sensor was obtained as representative of the noise component, but in this second preferred embodiment account is taken of the fact that the higher is the temperature the greater is the noise component due to the dark current, and an example is shown of the values of the noise component at several different temperatures being stored in the camera in advance.

Figure 10:
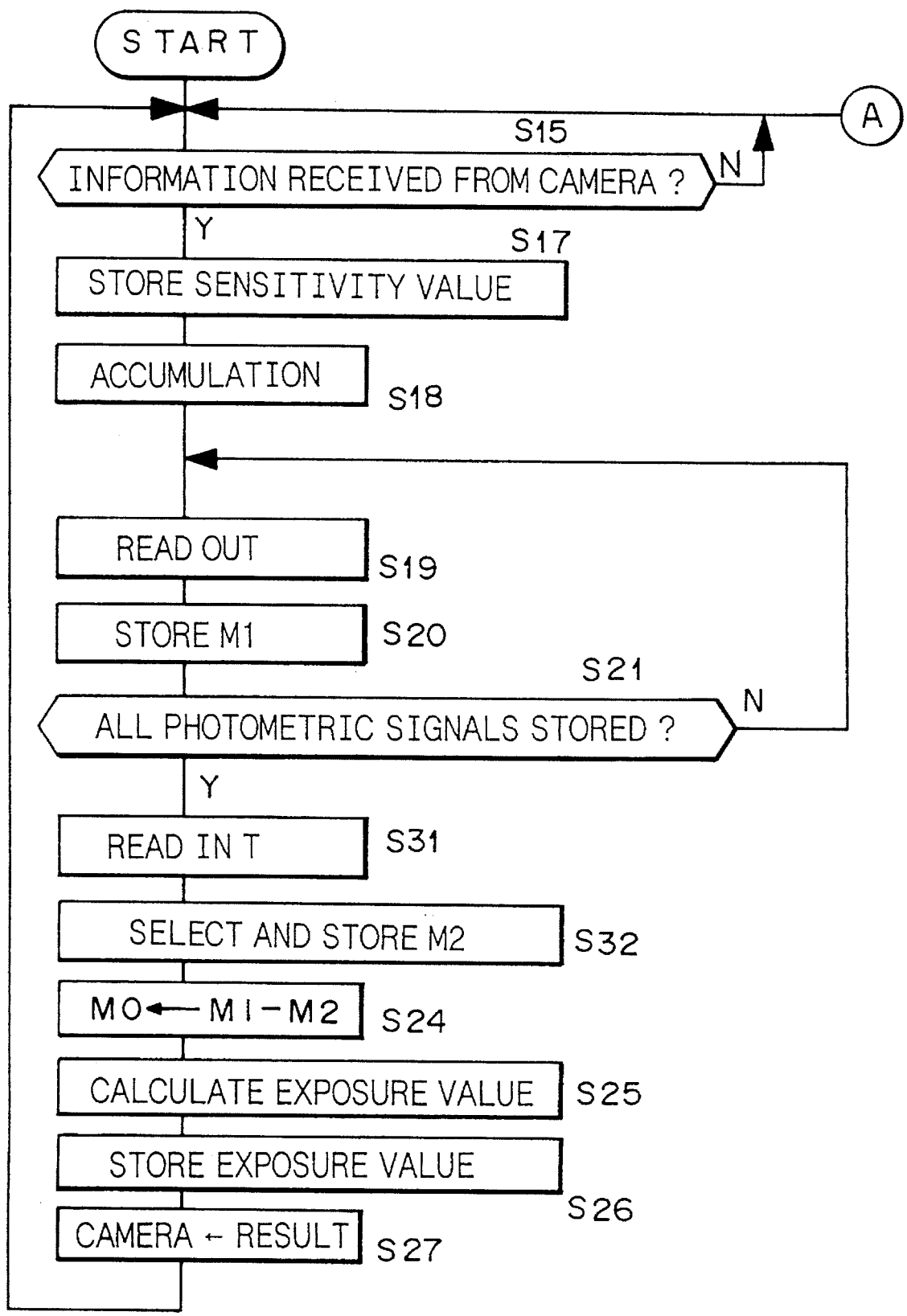
FIG. 10 is a flow chart showing a control sequence of the side of the viewfinder according to the second preferred embodiment of the present invention.

FIG. 10 shows a control sequence for the CPU 101 incorporated in the viewfinder 2. Steps which correspond to steps in FIG. 7 are denoted by the same step numbers, and the explanation will focus principally upon the points of difference between this second preferred embodiment and the first preferred embodiment.

In the step S15, the flow of control waits until the film sensitivity information is received. In this second preferred embodiment, since the mirror up signal is not necessary, only the film sensitivity information is inputted. In the step S17, the film ISO sensitivity value which has been input is stored. In the steps S18 through S21, as the same manner described above processes of charge accumulation, reading out, and storage are performed for all of the sub-elements of the photometric sensor 25. In this manner the first set M1 of photometric signals is stored in the storage circuit 104.

After this, the temperature T is read in from the temperature sensor 103 in the step S31, and in the step S32 the value of the noise component at this temperature T for all the sub-elements is obtained. In this second preferred embodiment, at a certain stage during the manufacture of the camera, the values of the noise component for all the sub-elements are determined by a process of experiment at a plurality of temperatures, and these values are memorized in the form of a table in the storage circuit 104. In the step S32, the values of the noise component corresponding to the temperature T detected in the above step S31 are selected from this table, and these values are stored in the storage circuit 104 as the compensation signals M2. Next, as the same manner described above, in the step S24 the photometric signal set M0 for exposure value calculation is obtained by subtracting the set M2 of compensation values from the first set M1 of photometric signals, in the step S25 the exposure value is calculated based upon this photometric signal set M0, in the step S26 this exposure value is stored, and in the step S27 this stored exposure value is transferred to the camera body side.

According to the above described procedure, along with detecting the temperature T in the environment of the camera by the temperature sensor 103, the values corresponding to this temperature T of the noise component are extracted from the table stored in the storage circuit 104, and the exposure value is calculated based upon the values obtained by subtracting these noise component value (which correspond to the second set M2 of photometric signals of the first preferred embodiment) from the first set M1 of photometric signals which have been obtained from the photometric sensor 25. According to this method, since just as described above the exposure value is calculated based upon the proper illumination component indicating the actual illumination of the object to be photographed, it is possible to obtain an appropriate exposure value without suffering any influence from photometric errors. Moreover, in this second preferred embodiment, it is not necessary to intercept the light from the object to be photographed which is being directed upon the photometric sensor 25 by any light interception means as described above.

Although with the first and second preferred embodiments described above a CCD was used as the photometric sensor, a photometric sensor other than a CCD could be used. That is to say, although the above described dark current phenomenon is specific to a charge coupled device (CCD) or the like, since the photometric signals can incorporate a noise component due to a cause other than a dark current, the construction of the first or the second preferred embodiment is also beneficial for a photometric sensor which is of a different type from the CCD type. Further, although an example shows the calculation of the exposure value performed by the CPU 101 incorporated in the viewfinder, it would also be acceptable for the calculation of this exposure value to be performed by the camera side. Again, although the above explanations have been made in terms of a camera which is equipped with a viewfinder which can be attached to and separated from the body of the camera, actually the present invention is also applicable to a camera of the type in which a viewfinder is incorporated within the body of the camera in advance. Further, the position of the photometric sensor is not to be considered as being limited to being located in the viewfinder. And, finally, although the above explanations have been made in terms of the so called divided photometry method in which photometry is performed on a plurality of divided regions in the photographic field, actually the present invention is also applicable to a camera of the type in which photometry is performed only on part of photographic field.

Embodiment 3

In this third preferred embodiment of the exposure calculation device, the basic construction is substantially the same as in the first and second preferred embodiments described above, except for the point that the temperature sensor is not incorporated in the viewfinder 2. Accordingly, the basic construction of this third preferred embodiment will not be described in detail herein.

First, the basic principle of how, in this third preferred embodiment, the inequalities in the photometric signals output from the photometric sensor 25 are compensated for will be explained.

The photometric signals which are output from the photometric sensor 25, which as shown in FIG. 3 is composed of an array of M×N sub-elements are substantially not uniform, even if an object to be photographed which is of absolutely uniform brightness level is placed in front of the photographic lens 4, due to minute variations in the size of the individual sub-elements, due to manufacturing deviations in the semiconducting wafers from which the CCD elements are made, due to variations in the transmission efficiency of the transmission circuitry when the electric signals which have been produced as a result of photoelectric conversion of the image of object to be photographed are transmitted, and the like. That is, minute deviations (errors) are included in the photometric signals between the various sub-elements, and as a result irregularities in photometry occur. The value of this type of minute deviation is characteristic to each of the sub-elements, and moreover remains stable over time.

Accordingly, although errors are initially present in the photometric signals which represent the luminance of the object which the photographer desires to photograph, it is possible to banish these deviations (these errors) by performing appropriate compensation on the photometric signals of the object to be photographed, as was performed according to the operation of the first and second preferred embodiments described above.

However, if the method is adopted of compensating by adding compensation values, which are stored for all of the sub-elements of the photometric sensor 25, individually to each of the photometric signals of the object to be photographed output from each of the sub-elements, then a storage circuit 104 of rather large capacity is required for storing the M×N compensation values for all of the sub-elements of the photometric sensor 25 shown in FIG. 3. For example, if in order to attain the high accuracy photometry, the value of M is set to 12 and the value of N is set to 18, and if the compensation values are 8-bit values, then a total of 1728 bits of storage capacity is required for the storage circuit 104, it may not be possible to include such a storage circuit in the camera, both because of its large size and also because of its high cost. Further, it can also be expected that the processing time required for reading out all the compensation values from such a storage circuit 104, and the processing time required for adding them all into the photometric signal values, will be considerable.

On the other hand, with a two dimensional photometric sensor like a CCD, the sensitivity inequality between neighboring sub-elements does not show very great variation, and in fact such a photometric sensor is known to have a sensitivity inequality which undulates relatively gently. In this third preferred embodiment, taking account of this characteristic, a number n of compensation values is prepared which is less than the total number M×N of sub-elements and the same compensation value is applied to a plurality of sub-elements which are included in a certain range.

Figure 11:
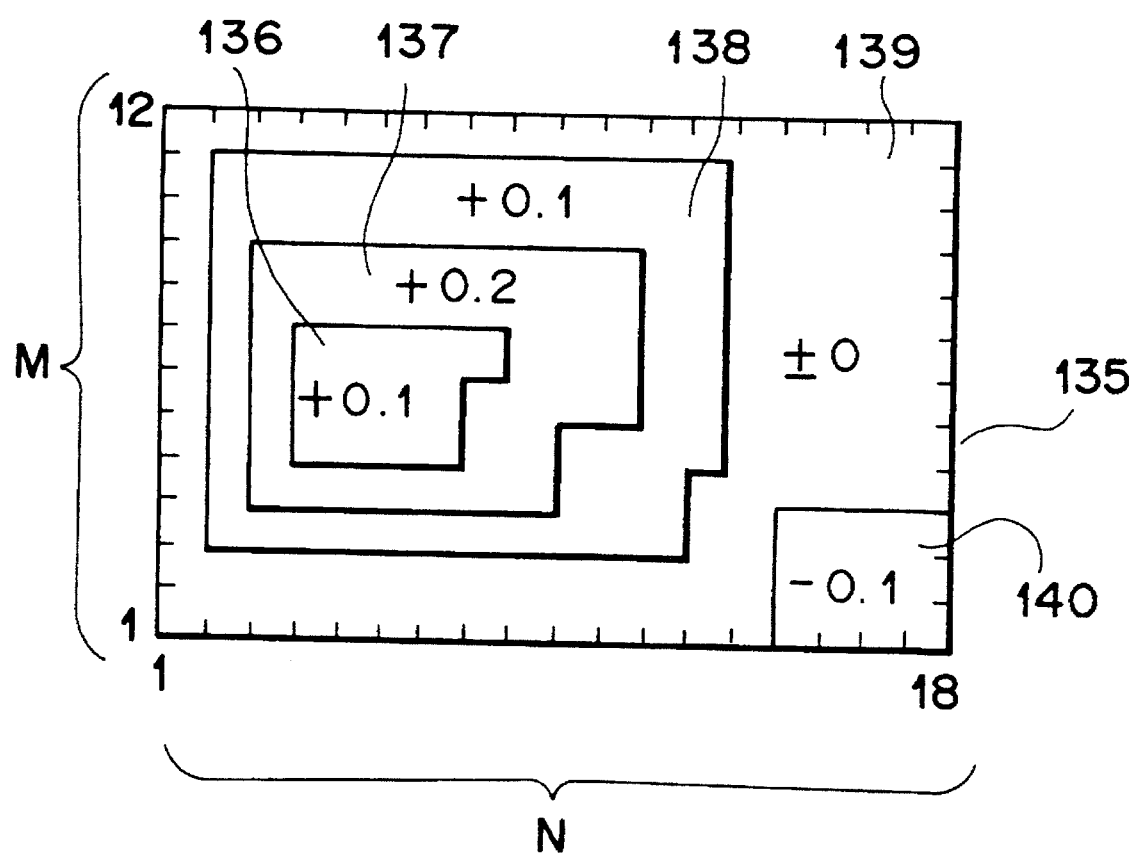
FIG. 11 is a figure showing an example of the distribution of sensitivity over the photometric sensor.

FIG. 11 shows an example of the distribution of sensitivity obtained when the photometric sensor 25 performs photometry on an object image having uniform brightness. The values "+0.1" and "−0.1" etc. show, with the second decimal place rounded off, the amount of deviation (units EV or the like) of the output of each of the sub-elements from a standard output level (for example from the average value of the output signal over all the sub-elements). As shown in the figure: over a region 136 somewhat to the left of the central portion of the photometric sensor 25 the outputs from the sub-elements are greater than the standard value by 0.1; over a region 137 ringing this region 136 the outputs from the sub-elements are greater than the standard value by 0.2; over another region 138 ringing this region 137 the outputs from the sub-elements are greater than the standard value by 0.1; and over the remainder region 139 of the photometric sensor 25 the outputs from the sub-elements are equal to the standard value, except for a rectangular region 140 in the lower right of the photometric sensor 25 in which the outputs from the sub-elements are less than the standard value by 0.1.

A plurality of sub-elements for which the above described amounts of deviation are the same are considered as a single group of sub-elements, and an example of the result of grouping the sensitivity distribution of FIG. 11 into a plurality of groups of sub-elements is shown in Table 1.

TABLE 1

| No | Ma, Nb~Mc, Nd | | Compensation Value | No | Ma, Nb~Mc, Nd | | Compensation Value |
|---|---|---|---|---|---|---|---|
| 1 | 1, 1 | 1, 14 | 0 | 2 | 1, 15 | 1, 18 | −0.1 |
| 3 | 2, 1 | 2, 14 | 0.1 | 4 | 2, 15 | 2, 18 | −0.1 |
| 5 | 3, 1 | 3, 1 | 0 | 6 | 3, 2 | 3, 12 | 0.1 |
| 7 | 3, 13 | 3, 14 | 0.1 | 8 | 3, 15 | 3, 18 | −0.1 |
| 9 | 4, 1 | 4, 1 | 0 | 10 | 4, 2 | 4, 2 | 0.1 |
| 11 | 4, 3 | 4, 9 | 0.2 | 12 | 4, 10 | 4, 12 | 0.1 |
| 13 | 4, 13 | 4, 18 | 0 | 14 | 5, 1 | 5, 1 | 0 |
| 45 | 10, 1 | 10, 1 | 0 | 46 | 10, 1 | 10, 13 | 0.1 |
| 47 | 10, 14 | 10, 18 | 0 | 48 | 11, 1 | 11, 1 | 0 |
| 49 | 11, 2 | 11, 13 | 0.1 | 50 | 11, 14 | 11, 18 | 0 |
| 51 | 12, 1 | 12, 18 | 0 | | | | |

In this Table, "No." is the number of the group of regions, and Ma,Nb to Mc, Nd are the range of vertical and horizontal sub-element coordinates M,N from the starting point (Ma,Nb) to the ending point (Mc,Nd)—i.e. they show the range of the group of regions. Accordingly, Table 1 shows that, taking the first group No. 1 of sub-elements as an example, the compensation value for each sub-element is zero, for a total of fourteen sub-elements from M1, N1 to M1, N14.

As can be determined from this table, the number of groups of sub-elements, which is 51, corresponds to the number of compensation values which must be stored in the storage circuit 104, and therefore the total memory space required for the compensation values is reduced from 1728 bits (12×18×8) to 408 bits (51×8). Accordingly a smaller storage capacity will be sufficient for storing all the compensation values. In short, it is not necessary to store a compensation value for each of the M×N sub-elements and it is possible greatly to reduce the memory capacity required for the storage circuit 104, because a plurality of sub-elements for which the compensation value is the same are grouped as a single group of sub-elements, the single group being indicated by a function of M and N, and the compensation value is stored for each group of sub-elements.

FIG. 12 shows the operation of the program which is executed by the CPU 74 incorporated in the camera body 1 in this third preferred embodiment. In FIG. 12, steps identical to the steps in FIG. 6 are denoted by the same step numbers.

The operation of this program starts when power starts to be supplied from the DC/DC converter 71. Herein, only the portions of the operation which pertain to the photometric operation of the photometric sensor 25 will be described, and description of the operation of the other functions will be omitted in the interests of brevity.

In the step S1, the sensitivity of the film in the film cartridge is detected by the film sensitivity detection circuit 72. In the step S2, a signal transmission is performed from the camera body 1 to the viewfinder 2. Namely, a film sensitivity signal is transmitted from the side of the camera body 1 via the contacts 83 and 93 to the side of the viewfinder 2. In the step S3, a signal transmission is performed from the viewfinder 2 to the camera body 1. That is to say, the CPU 74 waits until an appropriate exposure value which is calculated after correction for variation of sensitivity of the sub-elements of the photometric sensor 25, is transmitted from the viewfinder 2 via the contacts 84 and 94. When the appropriate exposure value is received, the flow of control passes to the next step S4, in which an aperture opening value and a shutter time are determined based upon the appropriate exposure value and displayed on the liquid crystal display 6. In the step S5, the on-off state of a shutter release switch which is actuated by the shutter release button 5 is queried to see whether photography is commanded. If this release switch is not currently being actuated, then the flow of control is transferred back to the step S1 to perform the steps S1 through S4 again in a loop.

When the shutter release button is actuated, in the step S6 the main mirror 21 is raised so as to be detracted from the light path to the film. In the step S8, the iris 77 is controlled to be set to the aperture opening value which was transmitted from the viewfinder 2 in the step S3. In the step S9, the shutter 76 is controlled to be opened and closed according to the shutter speed which similarly was transmitted from the viewfinder 2 in the step S3. Finally, when the exposure process is completed in the step S10 the film forwarding motor 78 is controlled to rotate through a predetermined rotational amount so as to wind on the film and make a preparation for the next photography.

Figure 13A:
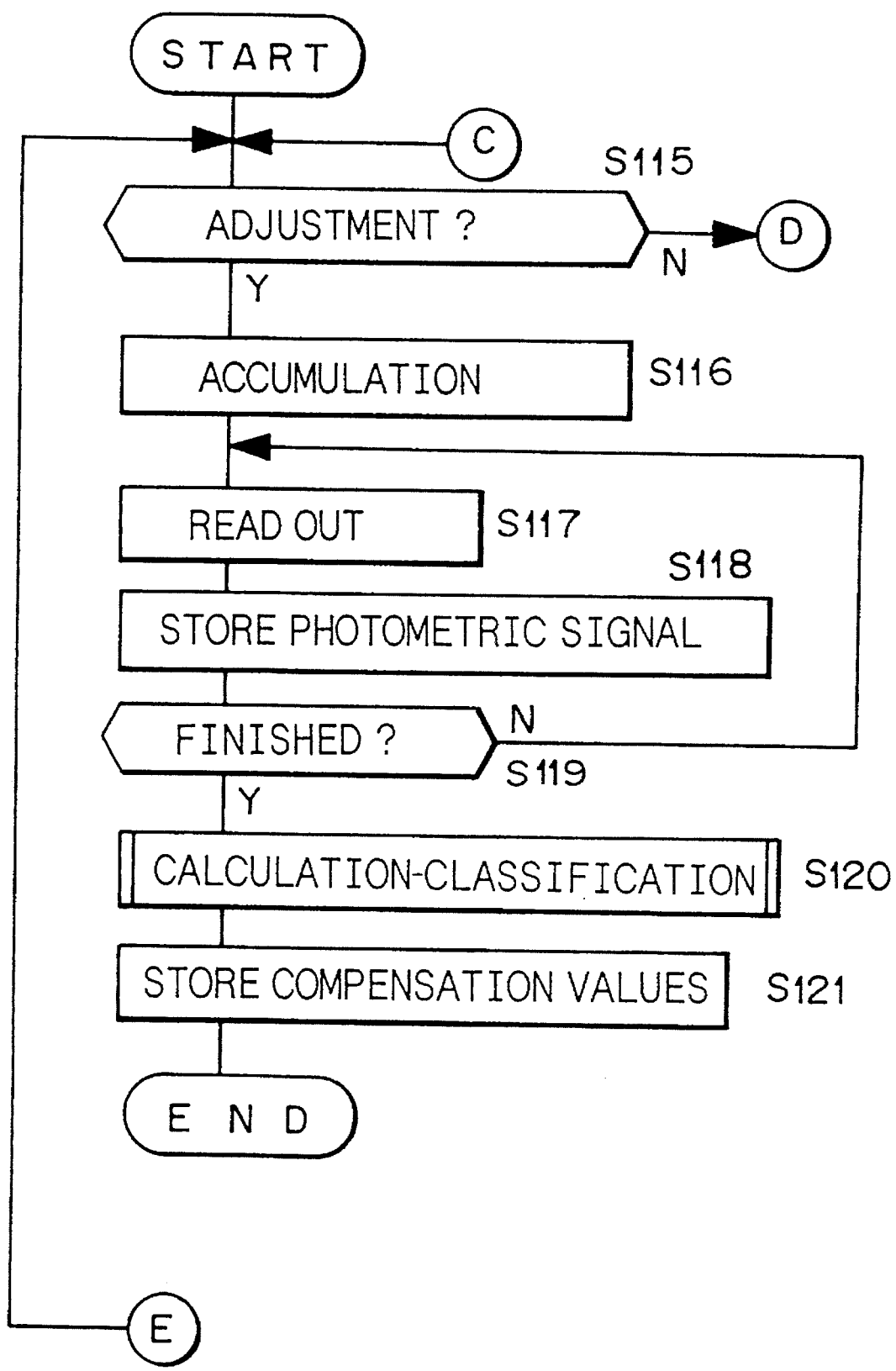
FIGS. 13A and 13B are flow charts showing a control sequence of the side of the viewfinder according to the third preferred embodiment of the present invention.
Figure 13B:
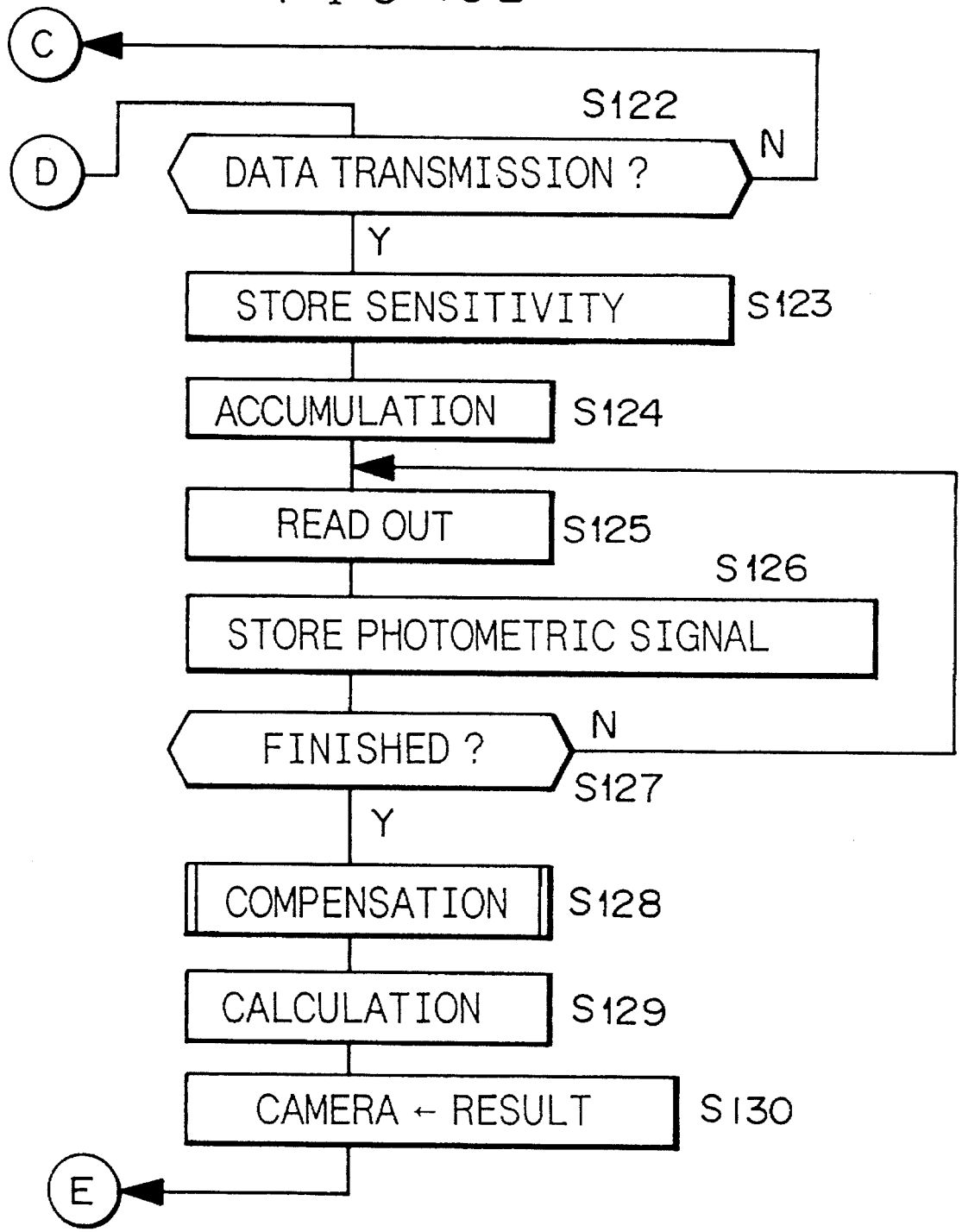

FIGS. 13A and 13B show the operation of the control program for the CPU 101 incorporated in the viewfinder 2 in this third preferred embodiment. The execution of this program starts when power is supplied from the DC/DC convertor 71 in the camera body 1 via the contact 93.

In the step S115, a decision is made as to whether or not the viewfinder 2 is set to the adjustment mode. This adjustment mode is a mode for deriving the compensation values for the sub-elements of the photometric sensor 25. This adjustment mode may be commanded via hardware by providing a switch to the input of the CPU 101 of the FIG. 5 electrical circuit so that by turning this switch on or off the viewfinder 2 may be switched over between a normal mode and the adjustment mode, or it may be commanded via software by sending an command signal for switching over to said adjustment mode via the data transfer terminals 94 and 95, or the like. If the result of the decision is that the adjustment mode is currently set the flow of control proceeds to the step S116 and the following steps so as to perform the adjustment process. While if the adjustment mode is not currently set the flow of control proceeds to the step S122 and the following steps so as to perform photometry for the object to be photographed in the normal photometric mode. When the adjustment mode is set, it is necessary to perform photometry for an object image having uniform brightness. If the photographer is performing this adjustment operation himself, for example, photometry on a uniformly illuminated white wall should be performed.

In the step S116, at first a photometry is performed by the photometry sensor 25. Namely, a per se known process of charge accumulation is performed in which the light incident to the photometry sensor 25 is converted into electric charge. In the next step S117, an analogue signal for each of the sub-elements of the photometry sensor 25 which is transferred to an input terminal of the CPU 101 according to the supply of a predetermined clock signal from the drive circuit 102 is read out in time series. The CPU 101 converts this input photometric signal into a digital signal.

In the step S118, the photometric digital signals thus obtained from an object image having the uniform brightness (hereinafter termed the equal illumination photometric signals) are stored one after another in the storage circuit 104. In the step S119, a decision is made as to whether or not an input of information for all of the sub-elements has been completed. If the information input has been completed, the flow goes to the step S120, while if no decision is made, the steps S117 through S119 are repeated.

In the step S120, the equal illumination photometric signals stored in the storage circuit 104 are again read out, the calculation process (described hereinafter with reference to the steps S135 through S138) for obtaining the compensation value for each of the sub-elements is performed, and then the process of separation of all of the sub-elements into a plurality of groups of sub-elements (described hereinafter with reference to the step S139 of FIG. 14) by grouping them in groups which have the same compensation value (for example the value 0.1 EV) is performed. The number of compensation values obtained (which is equal to the number of groups of regions) is less than the total number M×N of sub-elements in the photometry sensor 25. In the step S121, the compensation values for the various groups of sub-elements obtained in the step S120 are stored in the storage circuit 104, and then the operation of this program ends. Now, these compensation values stored in the storage circuit 104 are read out and used during the normal photometric mode in which photometry is performed for an object which is to be photographed.

If the result of the decision in the step S115 is that the adjustment mode is not currently set, since the normal mode is currently set the CPU 101 waits in the step S122 until a data transmission from the camera body 1 is performed. The data transmission in the step S122 corresponds to the one in the step S2 is for and a requirement of the transmission of the film sensitivity. In the step S123, since for the first time a signal transmission from the camera body 1 is performed and the film sensitivity is obtained, this film sensitivity value is stored in the storage circuit 104.

In the step S124, at first a photometry is performed by the photometry sensor 25. Namely, a per se known process of charge accumulation is performed in which the light incident to the photometry sensor 25 is converted into electric charge and then the electric charge thus converted is accumulated. As is different from the step S116, in this case photometry is being performed for the object which the photographer wishes to shoot.

In the step S125, an analogue signal for each of the sub-elements of the photometry sensor 25 which is transferred to an input terminal of the CPU 101 according to the supply of a predetermined clock signal from the drive circuit 102 is read out in time series. The CPU 101 converts this input photometric signal into a digital signal.

In the step S126, the digital signal thus obtained is stored in the storage circuit 104 one by one. In the step S127, a decision is made as to whether or not an input of information for all of the sub-elements has been completed. If the input information has been completed, the flow goes to the step S128, while if no decision is made, the steps S125 through S127 are repeated.

In this step S128, the compensation values obtained in the step S121 are added to the photometric signals relating to the object to be photographed which have been obtained as described above and have been stored in the storage circuit 104. By this process, variations in the individual sensitivities of the photometric sensor 25 are compensated for. In the step S129, the calculation of exposure value is performed based upon the photometric signals of the object to be photographed which have been compensated as described above and the film sensitivity which was obtained in the step S123.

In the step S130 the result of this calculation, i.e. the appropriate exposure value, is transferred of the side of the viewfinder 2 to side of the camera body 1 and then the flow is terminated. The transmission of the appropriate exposure value corresponds to the step S3 in FIG. 12.

Figure 14:
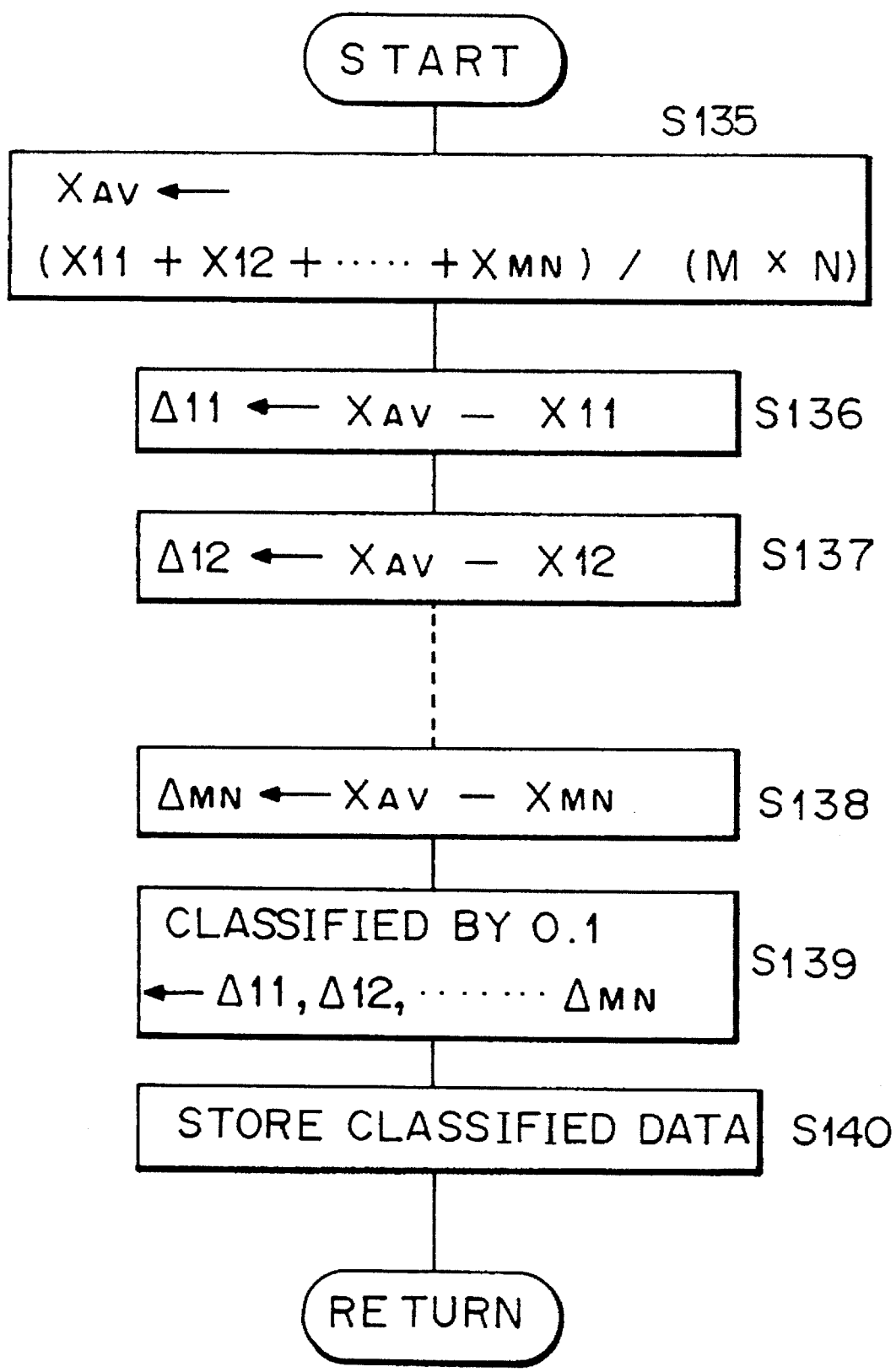
FIG. 14 is a flow chart showing the details of the step S120 of the FIG. 13A.

FIG. 14 shows the details of the process performed in the step S120 described above.

In the step S135, an average value XAV is obtained by averaging together the photometric signals from all of the sub-elements which have been obtained as results of photometry of the object to be photographed having uniform brightness. Here, "XMN" denotes the value of the output of the photometric sub-element in the Mth row and Nth column, while M×N represents the total numbers of sub-elements.

In the steps S136 through S138 the differences AMN are calculated between the photometric signals XMN from the various sub-elements and their average value XAV. As described above, rounding may be performed for the values ΔMN as required, according to the number of decimal places in the ΔMN which are coincide with the same for the classification of the data.

In the step S139, values ΔMN of the above described M×N data items are separated into a plurality of groups in which the step between neighboring values of ΔMN is 0.1, and as shown above and described with reference to the exemplary Table 1, a plurality of the sub-elements having the same value of ΔMN are classified into a single group.

Although in this third preferred embodiment the resolution for discriminating the group is 0.1 as described above, there is no objection if the discrimination resolution is more coarse than this, provided that it remains within the range which allows trouble free operation of the camera. Further, it would also be acceptable merely to truncate the values obtained in the calculation, either upwards or downwards or according to any fixed rule, rather than rounding them off.

In the step S140, the mutual relationship between each of the groups of sub-elements (the positions of the sub-elements in it) and the corresponding value of ΔMN (compensation value) is stored in the storage circuit 104. Now although in this third preferred embodiment an "Adjustment MODE" switch or the like was provided as incorporated in the camera body 1 or in the viewfinder 2 so that the photographer could make any sort of adjustment desired, it is also acceptable, as an alternative, for the construction to be such that the compensation values are stored in advance in the storage circuit 104 when the camera is despatched from the factory. In this case, there is no need for this "Adjustment MODE" switch to be provided, and there is no need for the photographer to perform any sort of operation in order to determine the compensation values.

Further, although in the above explanations of the respective embodiments, a viewfinder 2 can be attached to and separated from the body 1 of the camera, actually the present invention is also applicable to a camera of the type in which a viewfinder is incorporated within the body of the camera. In such a case, no CPU 101 would be required to be provided within the viewfinder 2, and it would be acceptable for the CPU 74 provided within the camera body 1 to receive the photometric signals from the photometric sensor 25, to separate them into groups, and to calculate the exposure value. Further, although the above explanations of the respective embodiments are directed to a so called single lens reflex camera which is equipped with a photographic lens 4 which can be detached from the body 1 Of the camera, actually the present invention can also be applied to a camera of the so called lens shutter type or the like in which the lens cannot be detached from the body of the camera.

Embodiment 4

The construction of this fourth preferred embodiment is substantially identical to that of the first and second preferred embodiments described above, except that no temperature sensor is provided in the viewfinder 2 and accordingly the explanation of the basic construction of this fourth preferred embodiment will be omitted.

First an explanation will be given, with reference to FIGS. 15 through 17, of the characteristic blooming and smearing of the image signals generated in the photometric sensor 25 when the object to be photographed is a bright point light source, by comparison with the ideal photometric situation.

FIG. 15 shows an ideal case example of recognition of an object to be photographed on the photometric sensor 25. That is, FIG. 15 shows a specimen of the way in which the brightness of the object to be photographed as detected by each of the sub-elements of the photometric sensor 25, i.e. an image of the object to be photographed, is stored in the storage circuit 104. Referring to FIG. 15, within the area having uniformly dark illumination level the images of two bright point light sources 116 and 117 are present at positions as shown in the figure. Because FIG. 15 shows an ideal situation, each of these images of the point light sources 116 and 117 is only present in a single sub-element, and they are not shown as exerting any influence upon the surrounding dark area.

FIG. 16, on the other hand, is an example of the so called blooming phenomenon is generated, and shows a specimen of recognition of the image of the same object to be photographed, when the photometric signals relating to the object to be photographed as detected by the photometric sensor 25 have been stored in the storage circuit 104. From FIG. 16 it will be understood that the portions 118 and 119, which surround the bright point light sources 116 and 117 and should be originally dark, have somewhat of brightness.

This type of blooming is a phenomenon which arises due to the surplus charge from the particular light receiving sections or the particular signal transmission circuits corresponding to the image of the bright point light source leaking over to the surrounding sub-elements or circuits, so that not only the above described particular light receiving sections but also the surrounding ones appear to be of equal brightness. In these circumstances, the amount of influence upon the surroundings of the image of the point light source varies according to the brightness of the point light source and its difference from the brightness of its surroundings and so on, but generally the central point of the image of the point light source has the original brightness and then a gentle transition is made to the low light level of the surroundings.

Figure 17:
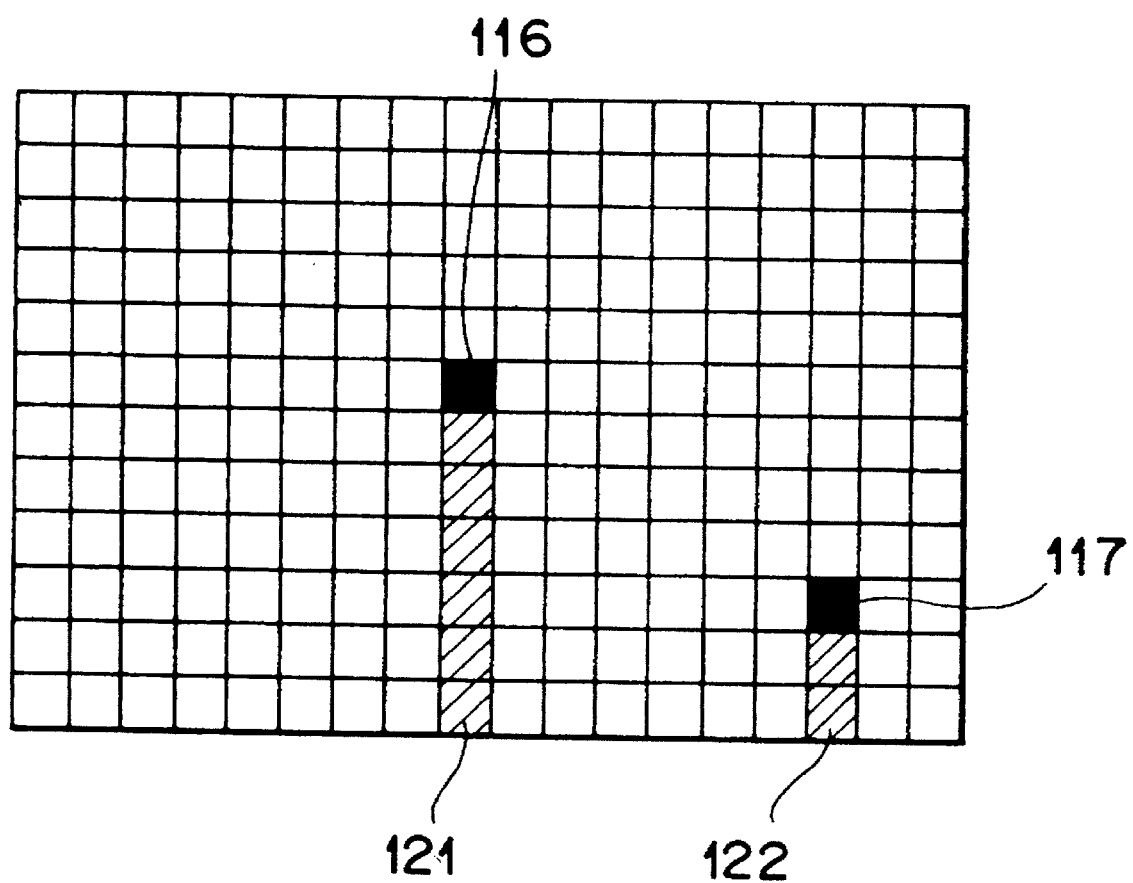
FIG. 17 is a figure showing a detection result of an object image when occurring smearing phenomenon due to the high brightness object.

Further, FIG. 17 is an example of the so called smearing phenomenon. Referring to this figure, a line shaped portion having a low brightness appears in portions 121 and 122 which ought to be dark below the two point light sources 116 and 117. Among two dimensional sensors, this kind of smearing only appears in a two dimensional sensor of the so called frame transfer type in which light receiving operation is performed even during signal transfer. And, with regard to the direction of transfer of the signal, it can also happen that spurious low brightness portions can appear in the direction above the point light source, or the like. In the case of this kind of smearing, the amount of influence upon the surroundings of the point light source differs from that in the case of blooming, and is determined by the brightness of the point light source and by factors related to drive timing such as transfer timing and the like.

The above described blooming and smearing are considered to be matters which exert a serious influence upon the calculation of an exposure value when, as in the present embodiment, the photometric sensor 25 is used as the means for photometry of the brightness of the object to be photographed. For example, when an image of the sun appears as part of the image of the object to be photographed, the parts which should be at the proper normal brightness of the surroundings of the sun are mistakenly taken to be very bright by attracting brightness from the sun. Because of this, the results of the calculation, if not modified, provide insufficient light for exposure, and the final outcome is that the most suitable exposure conditions are not obtained.

With the present fourth preferred embodiment, for example, the following type of processing is performed in order to eliminate the bad influence of the above type of blooming or smearing. This processing will be explained with reference to FIG. 18.

First, with regard to blooming, if data elements are present which exhibit a brightness greater than a predetermined value, first a central region is designated in which data elements are present which exhibit brightness above that predetermined value, and then, along with replacing the brightness signals from this central region by values less than a predetermined maximum value, the level of the data elements from the surrounding regions is reduced by a constant proportion.

Figure 18:
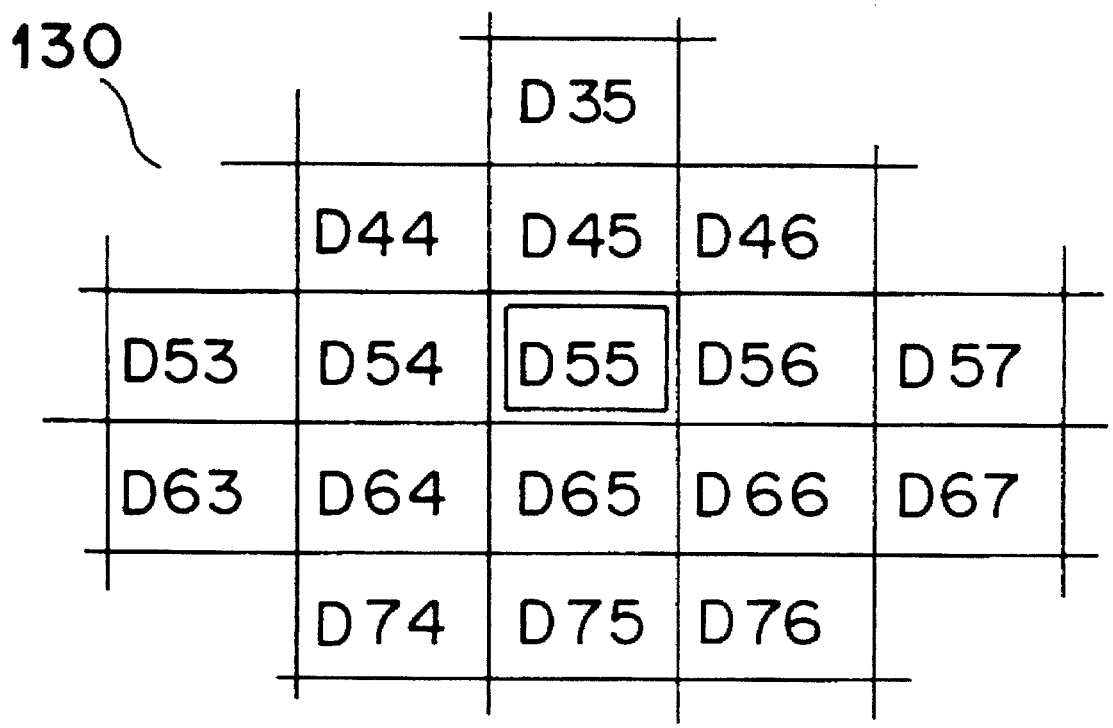
FIG. 18 is a figure showing a map of the data elements in the particular area in the photometry sensor.

FIG. 18 is a partial figure showing a map of the data elements stored in the storage circuit 104. In this figure, DMN (M and N are indices) represents the photometric data element from the sub-element in the Mth row and the Nth column of the photometric sensor 25. Accordingly, the data element D55, which is the data element in the center of the portion of the data map shown in FIG. 18, is the data element received from the sub-element of the photometric sensor 25 in the fifth row and the fifth column.

Referring to FIG. 18, let us suppose that the data element in this figure corresponding to the point light source 116 in the previously described FIG. 16 is the data element D55, so that the value for D55 will represent an extremely high level of brightness, and furthermore let us suppose that, due to the above described blooming phenomenon, an influence is apparent upon the data elements around this data element D55.

In this fourth preferred embodiment, in order to eliminate the bad influence due to this sort of blooming, first a decision is made as to whether or not a brightness signal greater than a predetermined value is present in the outputs from the light receiving sections of the various sub-elements of the photometric sensor. For example, let us suppose that it is decided according to the result of this decision that only in the data element D55, a brightness signal greater than the predetermined value has been stored. In this event, the value in the data element D55 is changed to a fixed value less than a previously determined maximum value, which is stored therein. This is termed the high brightness cutoff process. Accordingly, when this process has been finished, no data elements will be present in the storage circuit 104 which have values greater than the above fixed value.

Next, the process is performed of reducing by a constant proportion the brightness values stored in the data elements D44, D45, D46, D54, D56, D64, D65, and D66, which are the data elements immediately surrounding the data element D55. The constant proportion in this case may desirably be determined according to the characteristics of the photometric sensor 25 so as to bring the brightness signal stored in these surrounding data elements such as D44 etc. to the most appropriate brightness level. Moreover, in case of necessity, it would be possible to perform a further process of reducing by another fixed proportion the brightness values stored in the next set of data elements which surround these immediately surrounding data elements D44 . . . D66.

Next, with regard to elimination of the influence of smearing, if it has been decided that data elements which contain brightness values higher than a predetermined value are present, first the above described central region is designated, and then the process is performed of reducing by a constant proportion the level of the data elements neighboring to the central region which extend in a direction, for example the downward direction, which is determined in advance according to the construction of the photometric sensor 25 and of its associated equipment. That is to say, the above described process for elimination of blooming is only performed for those sub-elements which extend away from the central region in a certain single fixed direction.

When explaining the processing using this data signal map shown in FIG. 18, it was hypothesized that the region 116 in the above described FIG. 17 corresponded to the data element D55 of FIG. 18, that only the data element D55 has a very high brightness value, and that the influence of the above described smearing was in the downward direction. Even in this case, first a decision is made as to whether or not the data signal output from each of the sub-elements of the photometric sensor 25 corresponds to a brightness greater than a certain predetermined level, and it is detected that in fact the value of the data element D55 corresponds to a brightness greater than said certain predetermined level. According to this detection, the value of this data element D55 is replaced by a previously determined constant value lower than the maximum value, and this value is stored. I.e., the above described high brightness cutoff process is performed. Next, the process is performed of reducing by a certain fixed proportion the brightness signals stored in the data elements D65, D75 . . . which correspond to the sub-elements of the photometric sensor 25 which extend in the downward direction from the high brightness region. The proportion for reduction in this case may desirably be determined, according to the operational characteristics of the photometric sensor 25, so as to bring the brightness level of the data elements D65 etc., after compensation, to an appropriate value.

Next, the above type of process of compensation will be further explained in detail with reference to FIGS. 19 through 21. Now, since in this fourth preferred embodiment the processing routine which is performed by the CPU 74 incorporated in the camera body 1 is identical to that (FIG. 12) in the third preferred embodiment, description thereof will be omitted here.

Figure 19:
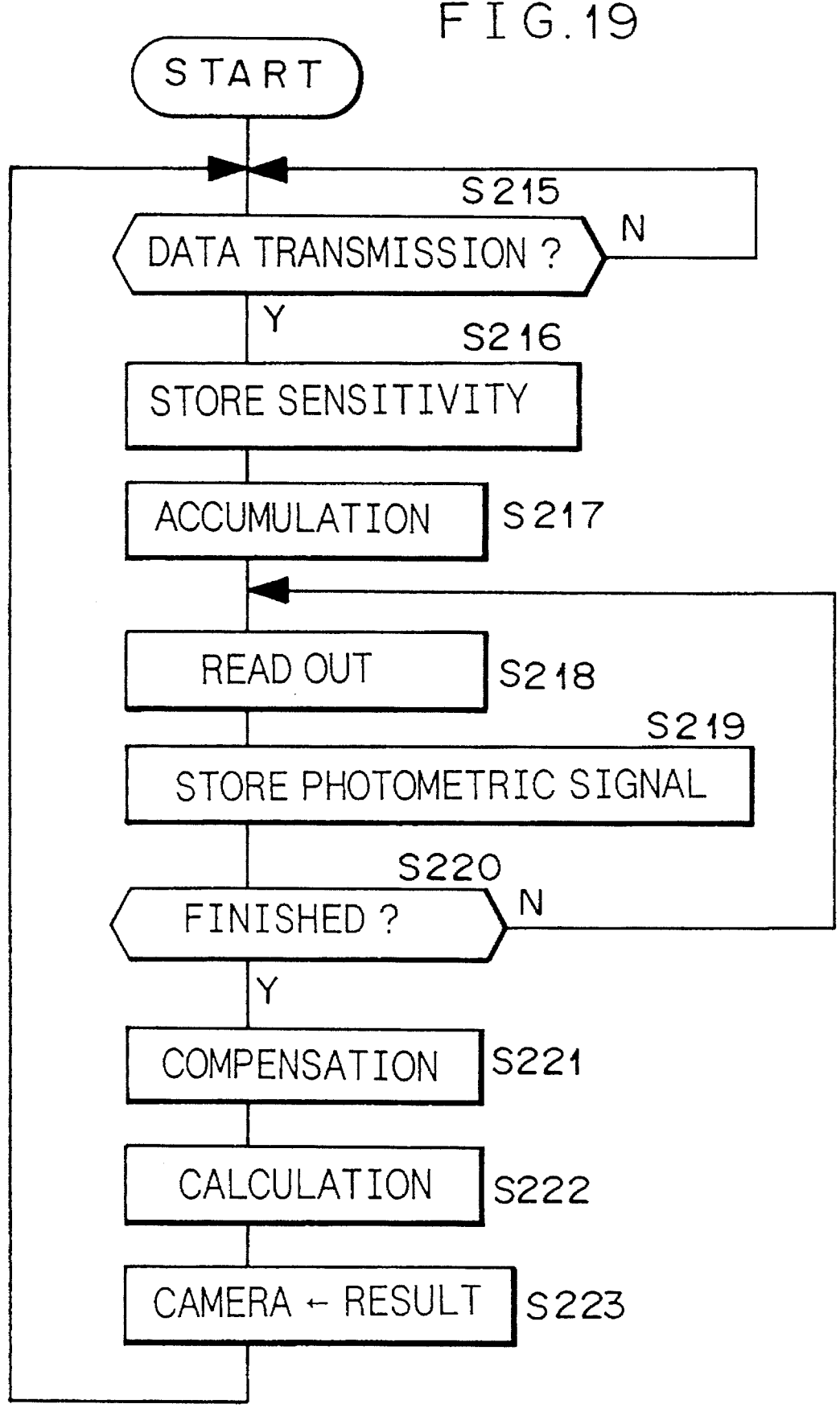
FIG. 19 is a flow chart showing a control sequence of the side of the viewfinder according to the fourth preferred embodiment of the present invention.
Figure 20:
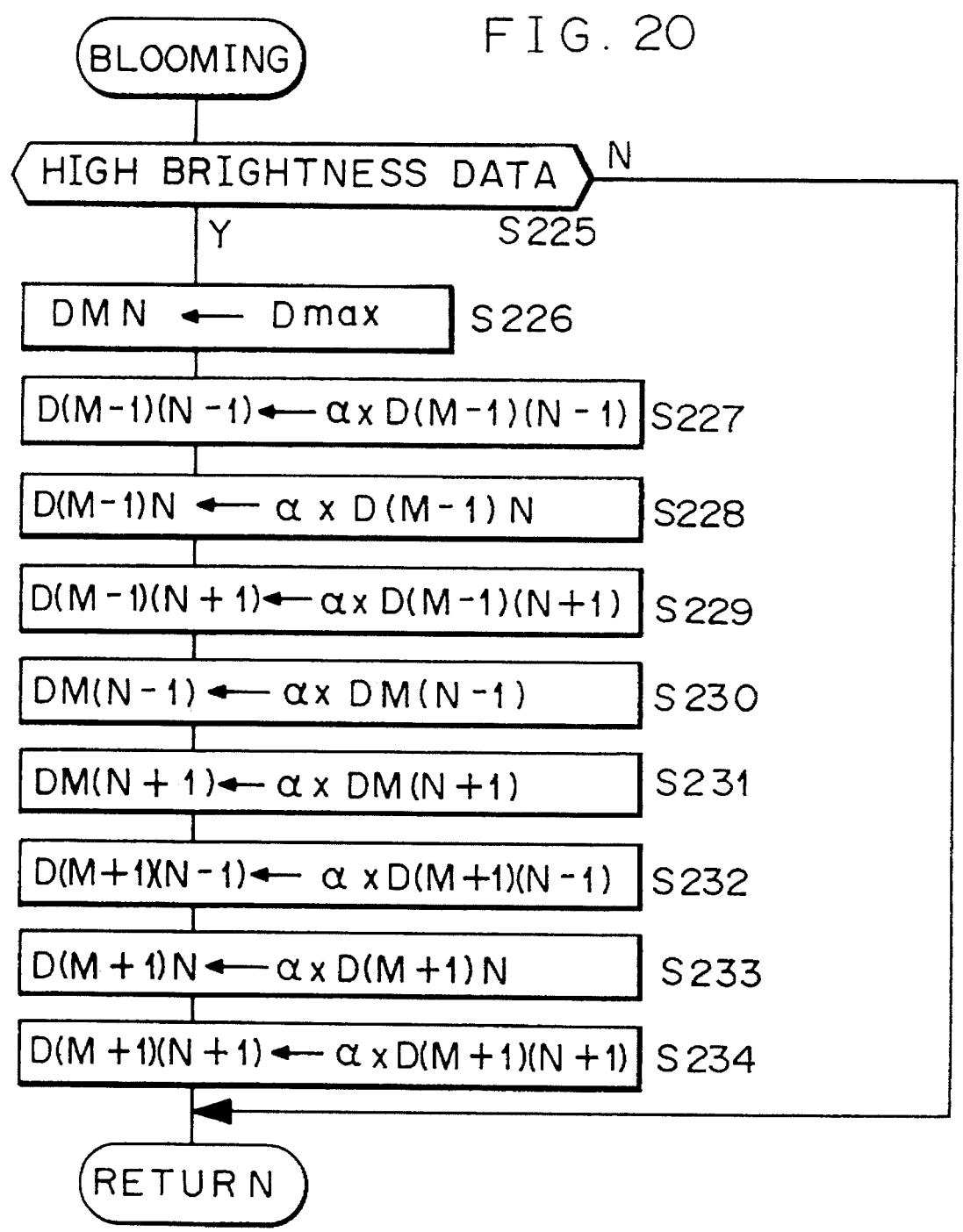
FIG. 20 is a flow chart showing a compensation process for blooming in the step S221 of the FIG. 19.

FIG. 19 is a flow chart showing the operation of the control program for the CPU 101. This control program of FIG. 19 is repeatedly executed in an endless loop as long as actuating electrical energy is being supplied from the DC/DC converter 71 in the camera body 1 via the contact 93 to the CPU 101 in the viewfinder 2, i.e. while the power source for the camera is switched on.

First, in the step S215, the flow waits in a loop until a data signal is received from the CPU 74 in the camera body 1. This data transmission corresponds to the step S2. In the step S216, the film sensitivity signal obtained from the camera body 1 is temporarily stored in the storage circuit 104.

Next, in the step S217, the charge accumulation operation of the photometric sensor 25 is performed via the drive circuit 102. Through this operation, the electric change according to the light from the object to be photographed received on each of its sub-elements is accumulated into minute capacity devices in the sensor. The darker is the object to be photographed, the longer is the charge accumulation time. And, in the step S218, the above described accumulated electric charges in the photometric sensor 25 is read out in time series. In the step S219, the analogue signal thus read out is converted into a digital signal and stores it in the storage circuit 104. And, in the step S220, a decision is made as to whether or not all of the photometry signals for divided sub-elements of the sensor 25 has been received, and the steps S218 through S220 are repeated until all of the photometric signals have been received.

When in the step S220 the decision is made that all of the signals from all of the sub-elements have been received, then the flow of control proceeds to the compensation subroutine S221, in which a process of compensation is performed. This compensation process will be described in detail hereinafter, and is for improving the values of the photometric signals representing the object to be photographed which are stored in the storage circuit 104 so as to eliminate the influence of blooming or smearing.

And next, in the step S222, the process of calculation of appropriate exposure value is performed based upon the photometric signals from the object to be photographed which have all been compensated as described above and the film sensitivity which was stored in the step S216. And in the step S223, the signal denoting the exposure value obtained in the step S222 is transferred to the side of the camera body by mean of the data transmission to the camera body 1 corresponding to the step S3 in FIG. 12. After this the flow of control returns to the step S215, and the above described process is repeated.

In the following, the concrete steps involved in the compensation process in the step S221 of the FIG. 19 will be explained. First, the compensation process for blooming will be explained with reference to the FIG. 20.

In the step S225, a decision is made as to whether or not, among the M×N data signals received from the photometric sensor 25, there is present any one data signal the value of which exceeds a certain predetermined threshold value. If no such data signal representing a brightness higher than a predetermined brightness is present, then the flow of control returns to the step S222 of the main routine.

If on the other hand in the step S225 it is detected that a data element having a value higher than the predetermined threshold value is present, then in the step S226 the value of this data element DMN is altered to be equal to a predetermined maximum value Dmax. By doing this, it is ensured that in the data signal, no data element having a value higher than the predetermined threshold value Dmax is present any longer. Moreover, in the explanation of this subroutine of this embodiment it has been supposed that the value of only one of the data elements exceeds the predetermined threshold value. However, if in fact the values of a plurality of the data elements exceed the predetermined threshold value, then for example, the values of all of these data elements which exceed the predetermined threshold value should be replaced by the maximum value Dmax, and the values of the data elements which surround this replaced data elements should then be compensated in the manner described below.

Next, in the step S227, as was previously explained with the use of FIGS. 16 and 18, in order to reduce by a constant proportion the values of the surrounding data elements which have been affected by the blooming phenomenon therefrom, first the original value of the data element D(M−1)(N−1) on the upper left of the data element DMN is replaced by its value multiplied by a compensation coefficient $\alpha$ which is a positive number less than unity. Next, in the step S228, the original value of the data element D(M−1)N directly above the data element DMN is similarly replaced by its value multiplied by the constant compensation coefficient $\alpha$. Next, in the step S229, the original value of the data element D(M−1)(N+1) on the upper right of the data element DMN is similarly replaced by its value multiplied by the constant compensation coefficient $\alpha$. Next, in the step S230, the original value of the data element DM(N−1) directly to the left of the data element DMN is similarly replaced by its value multiplied by the constant compensation coefficient $\alpha$. Further, in the step S231, the original value of the data element DM(N+1) directly to the right of the data element DMN is similarly replaced by its value multiplied by the constant compensation coefficient $\alpha$. Further, in the step S232, the original value of the data element D(M+1)(N−1) on the lower left of the data element DMN is similarly replaced by its value multiplied by the constant compensation coefficient $\alpha$. Yet further, in the step S233, the original value of the data element D(M+1)N directly below the data element DMN is similarly replaced by its value multiplied by the constant compensation coefficient $\alpha$. And finally, in the step S234, the original value of the data element D(M+1)(N+1) on the lower right of the data element DMN is likewise replaced by its value multiplied by the constant compensation coefficient $\alpha$. Then the flow of control returns to the main program.

In the above described processing, only the data elements which directly adjoined the high intensity data element were considered as liable to influence from blooming and were processed, but if it is considered that the data elements which are distant by two spaces from said high intensity data element are liable to be affected by blooming, the following processing can be performed. I.e., in a manner identical to the above, first the value of the central data element which is of unduly high intensity (supposed to be the data element D55) is subjected to the above described high brightness cutoff process, then just as described above the values stored in the immediately surrounding square ring of data elements consisting of the data elements D44, D45, D46, D54, D56, D64, D65, and D66 are reduced by a certain first constant proportion (termed $\alpha$ in the above), and finally the values stored in the next surrounding square ring of data elements consisting of the data elements D33 through D37, D43, D47, D53, D57, D63, D67, and D73 through D77 are similarly reduced by a certain second constant proportion (generally a positive number smaller than the first constant proportion $\alpha$). Now, in this process, the values of the first and the second constant proportions are used, because the influence of the central high brightness data element D55 becomes less as the data elements is apart from the central high brightness data element D55. The values of these compensation coefficients should be determined in consideration of the particular characteristics of the photometric sensor 25 so as to give the most appropriate compensation values.

Moreover, if it is considered that the influence of the central high brightness data element will extend even beyond the two surrounding square rings of neighboring data elements described above, then it will be sufficient to perform the above described proportional reduction process a third time or even more. Further, if the influence from the central high brightness data element on the surrounding data elements varies, the compensation coefficient or coefficients can be varied according to the value of the brightness of this central data element. Alternatively the compensation process can be performed only for the first surrounding square ring of neighboring data elements when the brightness of the central data element is at merely a normal high brightness level, while said compensation process is performed for the second surrounding square ring of neighboring data elements or even for further surrounding data elements as well only if the brightness of said central data element is at a remarkably high brightness level.

In the following, the compensation process for smearing will be explained with reference to the FIG. 21.

First, in the decision step S240, a decision is made as to whether or not, among the M×N data signals received from the photometric sensor 25, there is present any one data signal the value of which exceeds a certain predetermined threshold value. If no such data signal representing a brightness higher than a predetermined brightness is present, then the flow of control returns to the step S222 of the main routine shown in FIG. 19.

If on the other hand in the step S240 it is detected that a data element having a brightness higher than the predetermined threshold value is present, then in the step S241 the value of this data element DMN is altered to be equal to a predetermined maximum value Dmax, i.e. a so called high brightness cutoff process is performed. By doing this, it is ensured that no data element having a value higher than the predetermined threshold value Dmax is present any longer.

Next, in the step S242, as was previously explained with the use of FIG. 18, in order to reduce by a constant proportion the values of the data elements extending in the downward direction from the data element which have been affected by the smearing phenomenon therefrom, first the original value of the data element D(M+1)N directly below the data element DMN is replaced by its value multiplied by a compensation coefficient $\beta$ which is a positive number less than unity. Next, in the step S243, the original value of the data element D(M+2)N directly below that data element D(M+1)N is similarly replaced by its value multiplied by the constant compensation coefficient $\beta$. This process of compensation of the values of the data elements extending in a straight line directly downwards from the data element DMN by the compensation coefficient $\beta$ is then continued. In the step S244, the value of the lowest data element D(M+n)N is replaced by its value multiplied by compensation value $\beta$, and then the flow of control is terminated.

Although in the explanation of the above processing it has been supposed that the value of only one of the data elements exceeds the predetermined threshold value, if in fact the values of a plurality of the data elements exceed said predetermined threshold value, then all of these data elements whose values exceed said predetermined threshold value should be subjected to the above described high brightness cutoff process, and those data elements which extend in the downward direction from said replaced data elements should then be compensated in the manner described above by the compensation coefficient β. Further, in the above exemplary description, it was assumed that the influence from the smearing phenomenon on all of the sub-elements extended in the downward direction. However, it is considered that the smearing phenomenon will propagate in the upward direction, or if it is considered that it will only be propagated for a limited distance along the photometric sensor 25, then compensation may be performed in the manner described above, mutatis mutandis.

Although the present invention has been shown and described in terms of several preferred embodiments thereof, it is not to be considered as limited to these embodiments. It will be apparent by one of ordinary skill in the art that the other embodiments may be made within a scope of the present invention.

I claim:

1. An exposure calculation device for a camera comprising a photometric means which performs photometry on the light from an object to be photographed and outputs a photometric signal related to the brightness thereof and a calculation means which calculates an exposure value based at least upon said photometric signal output from said photometric means, said exposure calculation device further comprising:

a condition change-over means by which a permission condition in which it permits light from an object to be photographed to reach said photometric means and a prevention condition in which it prevents light from an object to be photographed from reaching said photometric means are switched over; and:

a storage means which stores a first photometric signal which is output by said photometric means when change to said permission condition is performed by said condition change-over means and a second photometric signal which is output by said photometric means when change to said prevention condition is performed by said condition change-over means; wherein, said calculation means calculates said exposure value based upon the value obtained by subtracting said second photometric signal from said first photometric signal.

2. An exposure calculation device for a camera according to claim 1, further comprising a temperature detection means which detects the temperature in the camera, and wherein said calculation means, when the temperature detected by said temperature detection means is less than a certain predetermined temperature, calculates said exposure value based upon said first photometric signal without subtracting said second photometric signal therefrom.

3. An exposure calculation device for a camera according to claim 1, wherein change to said prevention condition is performed by said condition change-over means in response to the turning on of power to the camera, and at this time the photometric signal output by said photometric means is stored in said storage means as said second photometric signal.

4. An exposure calculation device for a camera according to claim 1, wherein:

said camera is a single lens reflex type camera;

said photometric means is provided in a viewfinder of said camera;

said condition change-over means includes a main mirror which can be switched over between a mirror down position which permits light from an object to be photographed to reach said photometric means and a mirror up position which prevents light from an object to be photographed from reaching said photometric means; and:

said storage means, when a photograph is being taken and said main mirror is in its said mirror up position, stores the photometric signal output from said photometric means as said second photometric signal for preparation of the next photograph.

5. An exposure calculation device for a camera according to claim 1, wherein, said photometry means comprises a photoelectric conversion portion having a plurality of regions arranged in a matrix form and converting the light incident to each of said regions into electric charge, and a CCD performing accumulation of electronic charge obtained by said photoelectric conversion portion.

6. An exposure calculation device for a camera according to claim 4, wherein said condition change-over means includes an eyepiece closing said viewfinder, said eyepiece intercepts, when said main mirror is in said mirror up position, the light passing from said viewfinder to said photometry means.

7. An exposure calculation device for a camera according to claim 1, wherein said condition change-over means includes a lens barrier protecting a photographic lens.

8. An exposure calculation device for a camera according to claim 1, wherein said photometry means is provided outside of the body of said camera separate from a photographic light path.

9. An exposure calculation device for a camera comprising a photometric means which performs photometry on the light from an object to be photographed and outputs a photometric signal related to the brightness thereof and a calculation means which calculates an exposure value based at least upon said photometric signal output from said photometric means, said exposure calculation device further comprising:

a temperature detection means which detects the temperature in the camera; and:

a noise component value detection means which obtains the value of the noise component in said photometric signal corresponding to the temperature detected by said temperature detection means; wherein, said calculation means calculates said exposure value based upon the value obtained by subtracting said noise component value obtained by said noise component value detection means from said photometric signal output from said photometric means.

10. An exposure calculation device for a camera according to claim 9, wherein said noise component value detection means comprises a noise component value storage means which stores a plurality of values of the noise component in said photometric signal as previously determined in accordance with a plurality of temperatures, and the noise component value is read out from said noise component value storage means according to the temperature detected by said temperature detection means.

11. An exposure calculation device for a camera according to claim 9, wherein, said photometry means comprises a photoelectric conversion portion having a plurality of regions arranged in a matrix form and converting the light incident to each of said regions into electric charge, and a CCD performing accumulation of electric charge obtained by said photoelectric conversion portion.

12. An exposure calculation device for a camera comprising a photometric means which performs photometry on a plurality of divided regions to which the light from an object to be photographed is incident and outputs a photometric signal related to the brightness of said region, and a calculation means which calculates an exposure value based at least upon said photometric signals output from said photometric means, said exposure calculation device further comprising:

a classification means which quantizes at a predetermined resolution the photometric signals obtained by performing photometry upon an object to be photographed having a uniform brightness, and then classifies said plurality of regions into a plurality of groups of regions each having the same quantized photometric signal value; and:

a storage means which, for each of said groups of regions classified by said classification means, stores one compensation value corresponding to the magnitude of said photometric signal; wherein, said calculation means compensates according to said compensation values the photometric signals obtained by performing photometry by said photometric means for an object to be photographed, and calculates an exposure value based upon said photometric signals after compensation.

13. An exposure calculation device for a camera according to claim 12, wherein said classification means calculates the difference between the average value of the photometric signals from said photometric means for all of said plurality of regions and each of said photometric signals, and then classifies into the same group of regions all of said regions for which said difference is substantially identical, and wherein for each of said groups of regions said storage means stores said difference as said one compensation value.

14. An exposure calculation device for a camera according to claim 12, wherein said exposure calculation device further comprising a classification switch and when said classification switch is operated, said classification is performed.

15. An exposure calculation device for a camera according to claim 12, wherein said photometry means comprises a photoelectric conversion portion having a plurality of regions arranged in a matrix form and converting the light incident to each of said regions into electric charge, and a CCD performing accumulation of electric charge obtained by said photoelectric conversion portion.

16. An exposure calculation device for a camera comprising a photometric means which performs photometry on a plurality of divided regions to which the light from an object to be photographed is incident and outputs a photometric signal related to the brightness of said region and a calculation means which calculates an exposure value based at least upon said photometric signal output from said photometric means, said exposure calculation device further comprising:

storage means which stores compensation values for each of said photometry outputs, said compensation values assigned to a plurality of groups of regions into which said plurality of regions are classified, each of said regions in the same group having the same characteristics, in accordance with characteristic difference between individual ones of the photometry outputs from said plurality of regions, wherein said calculation means compensates said photometry signal obtained by performing photometry on an object to be photographed by said photometry means according to said compensation value, said compensation value being assigned to the group including the region from which said photometry signal is outputted and stored in said storage means for each regions, said calculation means calculates an exposure value in accordance with the photometry signal thus compensated.

17. An exposure calculation device for a camera according to claim 16, wherein, said photometry means comprises a photoelectric conversion portion having a plurality of regions arranged in a matrix form and converting the light incident to each of said regions into electric charge, and a CCD performing accumulation of electric charge obtained by said photoelectric conversion portion.

18. An exposure calculation device for a camera comprising a photometric means which performs photometry on a plurality of divided regions to which the light from an object to be photographed is incident, and outputs a photometric signal related to the brightness of said region, and a calculation means which calculates an exposure value based at least upon said photometric signals output from said photometric means, said exposure calculation device further comprising:

a compensation means which decides whether or not said plurality of photometric signals includes an excessive value signal having a brightness higher than a predetermined value, and which performs, when said plurality of photometric signals does include such an excessive value signal having a brightness higher than a predetermined value, compensation by reducing the values of said excessive value signal and of the signals from a plurality of regions in the neighborhood of the region corresponding to said excessive value signal by predetermined amounts; wherein, said calculation means calculates an exposure value based upon the values of said photometric signals after compensation by said compensation means.

19. An exposure calculation device for a camera according to claim 18, wherein said compensation means performs compensation by reducing the value of said excessive value signal having a brightness higher than said predetermined value and the values of the signals output from a plurality of regions surrounding the region corresponding to said excessive value signal.

20. An exposure calculation device for a camera according to claim 18, wherein said compensation means replaces the value of said excessive value signal having a brightness higher than said predetermined value with a predetermined value which is less than the maximum value.

21. An exposure calculation device for a camera according to claim 18, wherein said compensation means performs said compensation by multiplying the values of said signals in said plurality of regions surrounding the region corresponding to said excessive value signal having a brightness higher than said predetermined value by a predetermined compensation coefficient which is less than unity.

22. An exposure calculation device for a camera according to claim 21 wherein, the closer is one of said regions surrounding the region corresponding to said excessive value signal having a brightness higher than said predetermined value to said excessive value signal region, the smaller is its said compensation coefficient.

23. An exposure calculation device for a camera according to claim 18, wherein, said photometry means comprises a photoelectric conversion portion having a plurality of regions arranged in a matrix form and converting the light incident to each of said regions into electric charge, and a CCD performing accumulation of electric charge obtained by said photoelectric conversion portion.

24. An exposure calculation device for a camera according to claim 18, wherein said compensation means performs compensation by reducing the value of said excessive value signal having a brightness higher than said predetermined value and the values of the signals present in at least a plurality of regions extending along a single predetermined direction from the region corresponding to said excessive value signal.

25. An exposure calculation device for a camera according to claim 24, wherein said compensation means replaces the value of said excessive value signal having a brightness higher than said predetermined value with a predetermined value which is less than the maximum value.

26. An exposure calculation device for a camera according to claim 24, wherein said compensation means performs said compensation by multiplying the values of said signals in said plurality of regions surrounding the region corresponding to said excessive value signal having a brightness higher than said predetermined value by a predetermined compensation coefficient which is less than unity.

27. An exposure calculation device for a camera according to claim 26, wherein, the closer is one of said regions surrounding the region corresponding to said excessive value signal having a brightness higher than said predetermined value to said excessive value signal region, the smaller is its said compensation coefficient.

28. An exposure calculation device for a camera according to claim 24, wherein, said photometry means comprises a photoelectric conversion portion having a plurality of regions arranged in a matrix form and converting the light incident to each of said regions into electric charge, and a CCD performing accumulation of electric charge obtained by said photoelectric conversion portion.

29. An exposure calculation apparatus for a camera comprising a photometric member, which performs photometry on the light from an object to be photographed and outputs a photometric signal related to the brightness thereof, and a calculation device, which calculates an exposure value based at least upon said photometric signal output from said photometric member, said exposure calculation apparatus further comprising:

a condition change-over device that switches between a permission condition in which light from an object to be photographed is permitted to reach said photometric member and a prevention condition in which light from an object to be photographed is prevented from reaching said photometric member; and a storage device that stores a first photometric signal output by said photometric member when said condition change-over device switches to said permission condition and a second photometric signal output by said photometric member when said condition change-over device switches to said prevention condition, wherein said calculation device calculates said exposure value based upon the value obtained by subtracting said second photometric signal from said first photometric signal.

30. An exposure calculation apparatus for a camera comprising a photometric member, which performs photometry on the light from an object to be photographed and outputs a photometric signal related to the brightness thereof, and a calculation device, which calculates an exposure value based at least upon said photometric signal output from said photometric member, said exposure calculation apparatus further comprising:

a temperature detection device that detects the temperature in the camera; and a noise component value detection device that obtains the value of the noise component in said photometric signal corresponding to the temperature detected by said temperature detection device, wherein said calculation device calculates said exposure value based upon the value obtained by subtracting said noise component value obtained by said noise component value detection device from said photometric signal output from said photometric member.

31. An exposure calculation apparatus for a camera comprising a photometric member, which performs photometry on a plurality of divided regions to which the light from an object to be photographed is incident and outputs a photometric signal related to the brightness of said region, and a calculation device, which calculates an exposure value based at least upon said photometric signals output from said photometric member, said exposure calculation apparatus further comprising:

a classification device that quantizes at a predetermined resolution the photometric signals obtained by performing photometry upon an object to be photographed having a uniform brightness, and then classifies said plurality of regions into a plurality of groups of regions each having the same quantized photometric signal value; and a storage device that, for each of said groups of regions classified by said classification device, stores one compensation value corresponding to the magnitude of said photometric signal, wherein said calculation device compensates according to said compensation values the photometric signals obtained by performing photometry by said photometric member for an object to be photographed and calculates an exposure value based upon said photometric signals after compensation.

32. An exposure calculation apparatus for a camera comprising a photometric member, which performs photometry on a plurality of divided regions to which the light from an object to be photographed is incident and outputs a photometric signal related to the brightness of said region, and a calculation device, which calculates an exposure value based at least upon said photometric signals output from said photometric member, said exposure calculation apparatus further comprising:

storage device that stores compensation values for each of said output photometry signals, said compensation values assigned to a plurality of groups of regions into which said plurality of regions are classified, each of said regions in the same group having the same characteristics, in accordance with characteristic difference between individual ones of the output photometry signals from said plurality of regions, wherein said calculation device compensates said photometry signal obtained by performing photometry on an object to be photographed by said photometric member according to said compensation value, said compensation value being assigned to the group including the region from which said photometry signal is outputted and stored in said storage device for each region, and said calculation device calculates an exposure value in accordance with the photometry signal thus compensated.

33. An exposure calculation apparatus for a camera comprising a photometric member, which performs photometry on a plurality of divided regions to which the light from an object to be photographed is incident and outputs a photometric signal related to the brightness of said region, and a calculation device, which calculates an exposure value based at least upon said photometric signals output from said photometric member, said exposure calculation apparatus further comprising:

a compensation device that decides whether said plurality of photometric signals includes an excessive value signal having a brightness higher than a predetermined value, and that performs, when said plurality of photometric signals does include such an excessive value signal having a brightness higher than a predetermined value, compensation by reducing the values of said excessive value signal and of the signals from a plurality of regions in the neighborhood of the region corresponding to said excessive value signal by predetermined amounts, wherein said calculation device calculates an exposure value based upon the values of said photometric signals after compensation by said compensation device.

* * * * *